(12) United States Patent
Pompilio et al.

(10) Patent No.: US 10,599,451 B2
(45) Date of Patent: Mar. 24, 2020

(54) SYSTEMS AND METHODS FOR AIDING COMPUTING USERS HAVING SUB-OPTIMAL ABILITY

(75) Inventors: Daniel V. Pompilio, Smyrna, GA (US); Jason P. Zamer, Atlanta, GA (US)

(73) Assignee: SimpleC, LLC, Atlanta, GA (US)

( * ) Notice: Subject to any disclaimer, the term of this patent is extended or adjusted under 35 U.S.C. 154(b) by 0 days.

(21) Appl. No.: 13/330,779

(22) Filed: Dec. 20, 2011

(65) Prior Publication Data
US 2012/0141970 A1   Jun. 7, 2012

Related U.S. Application Data

(63) Continuation of application No. 12/243,404, filed on Oct. 1, 2008, now Pat. No. 8,096,657.

(60) Provisional application No. 60/997,168, filed on Oct. 1, 2007.

(51) Int. Cl.
*G06F 9/451*        (2018.01)

(52) U.S. Cl.
CPC ................... *G06F 9/453* (2018.02)

(58) Field of Classification Search
CPC ........... A61B 3/028; A61B 3/032; A61B 3/00; A61B 3/10; A61H 5/00
USPC ....... 351/200, 203, 205, 222, 223, 237, 238, 351/246
See application file for complete search history.

(56) References Cited

U.S. PATENT DOCUMENTS

| | | | |
|---|---|---|---|
| 5,801,809 A * | 9/1998 | Husain | 351/239 |
| 6,561,993 B2 | 5/2003 | Adapathya et al. | |
| 7,367,675 B2 | 5/2008 | Maddalena et al. | |
| 7,517,086 B1 * | 4/2009 | Kurkure | G09B 21/008 351/246 |
| 2002/0178007 A1 | 11/2002 | Slotznik | |
| 2002/0180813 A1 * | 12/2002 | Ullmann | G06F 3/0481 715/856 |
| 2006/0066448 A1 * | 3/2006 | Berisford | G06Q 50/22 340/504 |
| 2006/0139312 A1 * | 6/2006 | Sinclair, II | G06F 3/0481 345/156 |
| 2007/0166676 A1 * | 7/2007 | Bird et al. | 434/236 |
| 2008/0150909 A1 * | 6/2008 | North | G06F 3/0418 345/173 |
| 2010/0128223 A1 * | 5/2010 | Blumenthal | A61B 3/032 351/237 |

OTHER PUBLICATIONS

Gajos et. al., "Automatically Generating Custom User Interfaces for Users With Physical Disabilities", ASSETS'06, Oct. 22-25, 2006, p. 243-244 (Year: 2006).*

(Continued)

*Primary Examiner* — Robert E. Tallman
(74) *Attorney, Agent, or Firm* — Jones Day

(57) ABSTRACT

Computer-implemented systems and methods create a user environment tailored to a user's computer abilities. A series of baseline tests are administered to new users for accumulating user metric data, and a database collects and stores the user metrics. Program logic is responsive to data from the data base, where the program logic is programmed to adapt the user environment to correspond to abilities measured through the baseline tests. The program logic is further programmed to adapt user interface controls to compensate for user dexterity abilities.

19 Claims, 20 Drawing Sheets

(56) References Cited

OTHER PUBLICATIONS

DonationCoder.com Forum, Idea: Lock Icons in Place on Desktop, Internet, Jul. 23, 2008.
http://www.donationcoder.com/Software/Skrommel, 1 Hour Software by Skrommel, Jul. 23, 2008.
www.alldigitalframes.com, Frequently Asked Questions, Jul. 23, 2008.
Silverman, Dwight, New Hardware for the Parents, TechBlog, Sep. 16, 2005.
Ullmer, B. and Ishii, H., Emerging Framworks for Tangible User Interfaces, IBM Systems Journal, vol. 39, Nos. 3 & 4, 2000.
Zhao, Yuexiao and Tyugu, Enn, Towards a Personalized Browser for Elderly Users, Electrum 204, S-164 40, Department of Teleinformatics, Royal Institute of Technology, Kista, Sweden (1998).
Abascal, Julio, Ambient Intelligence for People with Disabilities and Elderly People, Laboratory of HCE for Special Needs, University of the Basque Country—Euskal Herriko Unibertsitatea, Spain (2004).
Wu, Yu and Van Slyke, Craig, Interface Complexity and Elderly Users: Revisited, Proceedings of the 2005 Southern Association of Information Systems Conference, 2005.
Umbach, Kenneth W., What is "Push Technology"?, California Research Bureau, CRB Note vol. 4, No. 6, California State Library, Oct. 1997.
Neerincx, Mark A., Lindenberg, Jasper and Pemberton, Steven, Support Concepts for Web Navigation: A Cognitive Engineering Approach, WWW10, May 1-5, 2001, Hong Kong.
Zajicek, Mary P. and Arnold, Albert G., The 'Technology Push' and the User Tailored Information Environment, Oxford Brookes University, Oxford, UK (1999).
Lim, Ser Nam, A Guide for Website Developers about how to Accommodate Users with Low Education, Low Motivation, Universal Usability in Practice, University of Maryland, Apr. 18, 2001.
Qualilife SA, Product Guide, 2007, Switzerland.
Abrahams, Peter, A Simplified User Interface for People with Special Needs, Bloor Research, Mar. 26, 2008.

* cited by examiner

SYSTEMS AND METHODS FOR AIDING
COMPUTING USERS HAVING
SUB-OPTIMAL ABILITY

This application is a continuation of U.S. patent application Ser. No. 12/243,404, filed on Oct. 1, 2008, entitled "Systems and Methods for Aiding Computing Users Having Sub-Optimal Ability," which claims priority from U.S. Provisional Patent Application No. 60/997,168, filed on Oct. 1, 2007, and entitled "Systems and Methods for Instruction and Aid of Aging Computer Users," both of which are incorporated herein by reference in their entireties.

TECHNICAL FIELD

This document relates generally to computer use and instruction aids and more particularly to computer use and instruction aids for individuals with sub-optimal functional ability.

BACKGROUND

Computers have enabled greater access for individuals to information and to interact with each other. However, computers can pose the challenge of a steep learning curve that must be overcome to gain these benefits. This difficulty is further exacerbated in individuals having diminished physical or mental capacities. Individuals prone to these diminished or declining physical or mental capacities can include the elderly, mentally handicapped individuals, and those who have suffered debilitating injury or disease. These individuals are particularly prone to depression and anxiety brought on by a feeling of helplessness and isolation caused by a decline in physical or mental capacities. Thus, there is a need to enable these people to enjoy the social interaction and learning benefits of a computer system in an environment that mitigates computing difficulties caused by sub-optimal physical or mental capabilities.

SUMMARY

In accordance with the teachings provided herein, computer-implemented systems and methods provide adaptive control of a user computer experience. The system may include baseline tests that are administered to record baseline user metrics, where the baseline tests measure a user's visual acuity and manual dexterity. A user visual interface is adapted to correspond to the user's visual acuity measured through the baseline testing. User interface controls may also be adapted to correspond to the user's manual dexterity measured through the baseline testing.

As another illustration, a method of promoting muscle memory in a computer user may compile a set of baseline user metrics of user abilities using a new-user test. A user environment may be generated that corresponds to the measured user metrics. The user interface may then be locked down such that the user interface elements remain in a same position in the user environment.

As a further illustration, an apparatus for creating a user environment tailored to a user's computer abilities may include a database for collection and storage of user metrics and a series of baseline tests to be administered to new users for accumulating user metric data. The system may further include program logic responsive to data from the database, where the program logic is programmed to adapt the user environment to correspond to abilities measured through the baseline tests, and where the program logic is programmed to adapt user interface controls to compensate for user dexterity abilities.

As an additional illustration, an apparatus for developing muscle memory in computer users may comprise a user interface customized by data gathered through new-user tests, where the user elements are locked in place where a user cannot move or delete the user interface elements.

DETAILED DESCRIPTION

Figure 1A:
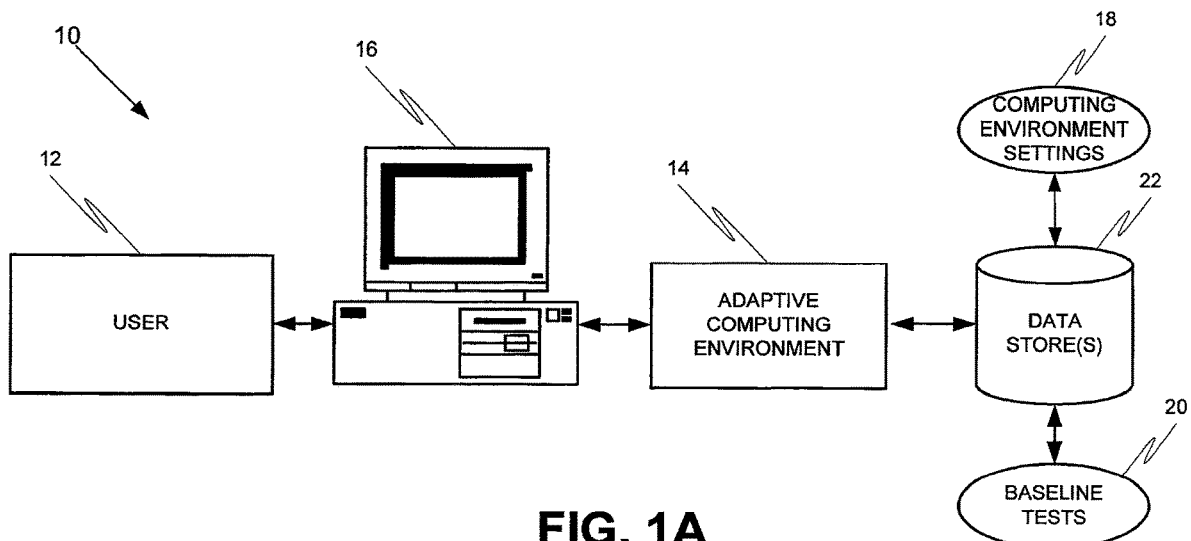
FIGS. 1A and 1B are block diagrams depicting computer-implemented environments wherein users can interact with an adaptive computing environment.
Figure 1B:
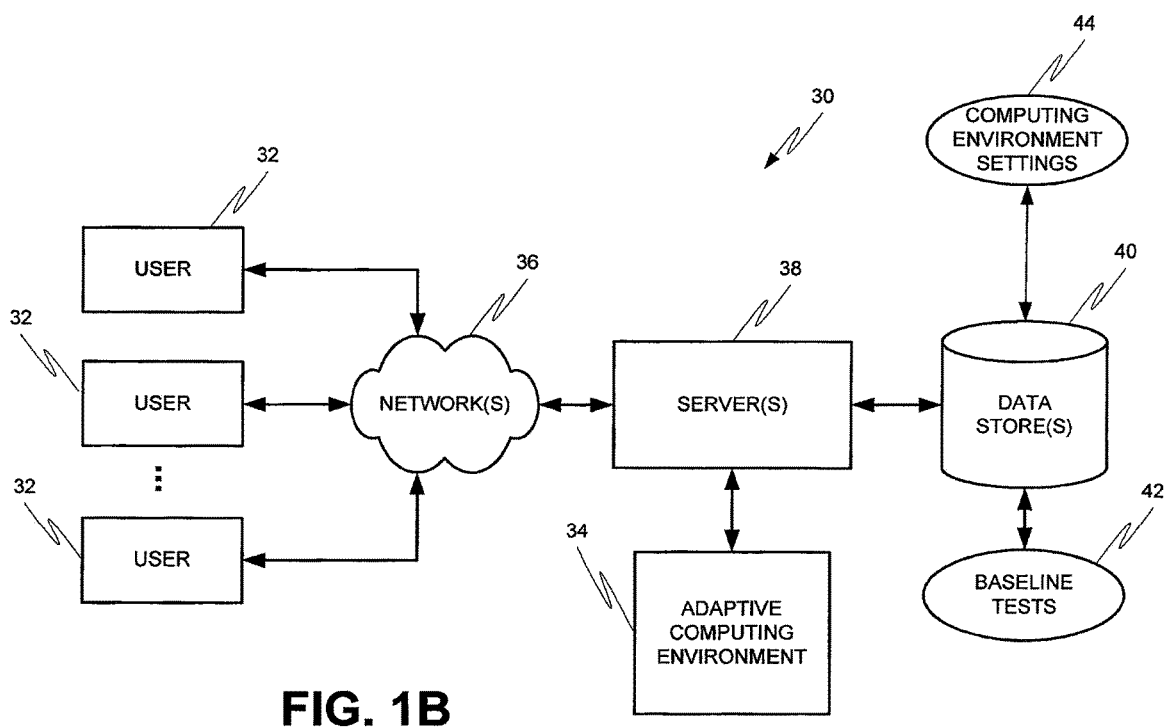

FIGS. 1A and 1B are block diagrams depicting computer-implemented environments wherein users can interact with an adaptive computing environment. FIG. 1A depicts at 10 a computer-implemented environment wherein users 12 can interact with an adaptive computing environment 14 hosted on a computer 16. An adaptive computing environment 14 is provided to the user 12 based on the user's physical and mental abilities. Computing environment settings 18 are adjusted in the adaptive computing environment 14 based upon the results of baseline tests 20. The computing environment settings 18 and the baseline tests 20 are stored in one or more data stores 22 that may be stored within the computer 16 or may be accessible to the computer through a network.

FIG. 1B depicts at 30 a computer-implemented environment wherein users 32 can interact with an adaptive computing environment 34 hosted on one or more servers 38 through a network 36. The system 34 contains software operations or routines for providing a customized user environment to a user 32 based on the user's physical and mental abilities. The adaptive computing environment 34 generates a customized user environment using results of baseline tests 42.

The adaptive computing environment 34 can be an integrated server-based tool that provides a user 32 a functional computer environment tailored toward that user's needs. The environment 34 may also be implemented on a stand-alone computer or other platforms. One or more data stores 40 can store baseline tests 42, test results, and computing environment settings 44 that are adjusted based on results of the baseline tests 42 as well as any intermediate or final data generated by the adaptive computing environment 34. For example, the data store(s) 40 can store a series of baseline tests 42 and scores from those tests taken by users 32. In light of these results, computer environment settings 44 are adjusted for the user 32, and those computer environment settings 44 are stored in the data store(s) 40. These computer environment settings 44 may be accessed and applied when a user 32 logs onto a client computer connected to the adaptive computing environment 34. Examples of data store(s) 40 can include flat files, cookies, relational database management systems (RDBMS), a multi-dimensional database (MDDB), such as an Online Analytical Processing (OLAP) database, etc.

The users 32 can interact with the adaptive computing environment 34 through a number of ways, such as over one or more networks 36. One or more servers 38 accessible through the network(s) 36 can host the adaptive computing environment 34. The adaptive computing environment 34 may be implemented such that a user 32 may log into one of several computers, such as in a computer lab, in a network environment such that computer environment settings 44 associated with that user may be applied despite the use of a different client machine. It should be understood that the adaptive computing environment 34 could also be provided on a stand-alone computer for access by a user 32.

Figure 2:
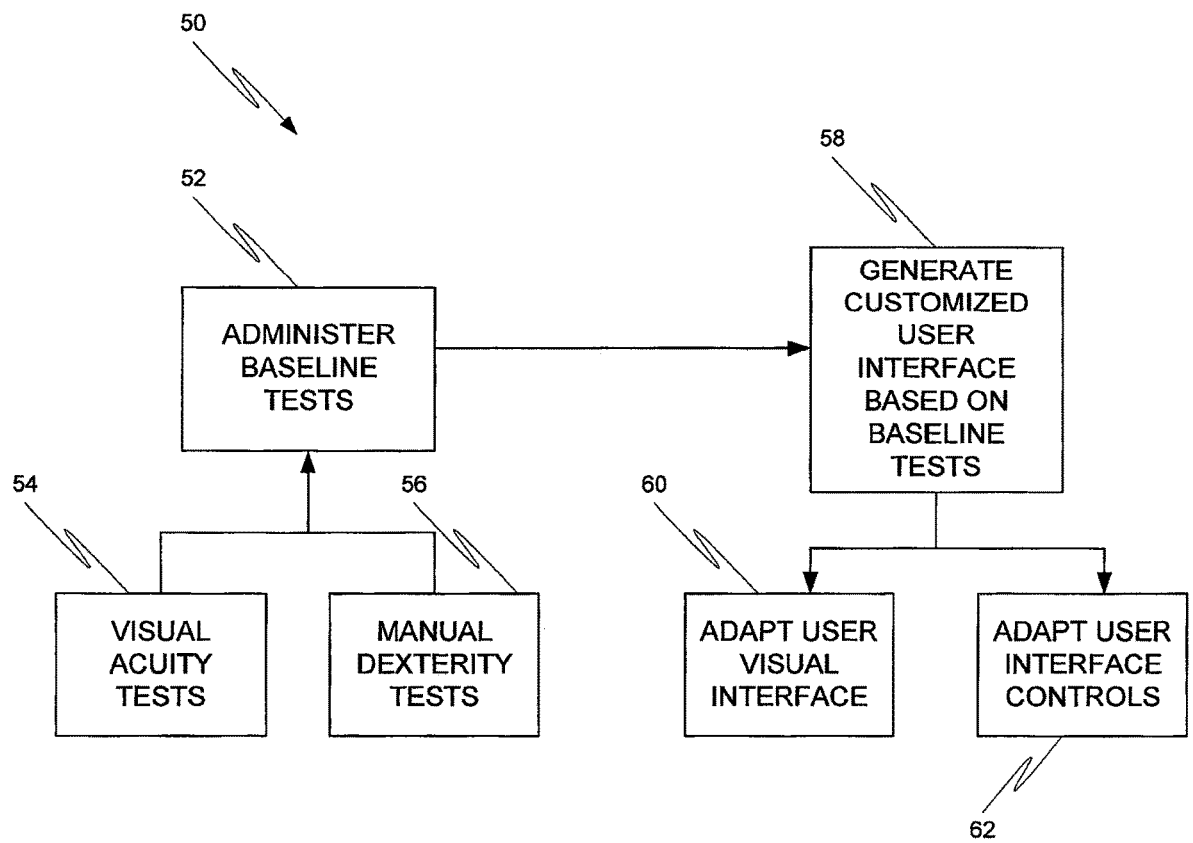
FIG. 2 is a flow diagram depicting a process of generating a customized user interface based on baseline testing.

FIG. 2 is a flow diagram depicting a process of generating a customized user interface based on baseline testing. At 52, a new user is administered one or more baseline tests to measure the user's physical and/or mental capabilities. These baseline tests may include for example, one or more visual acuity tests 54 and one or more manual dexterity tests 56. Based on the results of the baseline tests administered at 52, a customized user interface is generated and presented to the user as depicted at 58. The adaptive computer environment may adapt aspects of the user interface based on the baseline testing as shown at 60. Additionally, the adaptive computer environment may adapt user interface controls based on the baseline testing as shown at 62. The customized user environment generated at 58 may be saved such that a user may return to his customized environment without requiring a retake of the baseline tests. For example, the generated user interface and interface control parameters that are set based on the administered baseline tests may be stored on a hard drive or in a data store such that they may be automatically applied the next time the user logs on to a computer connected to the adaptive computer environment.

Figure 3:
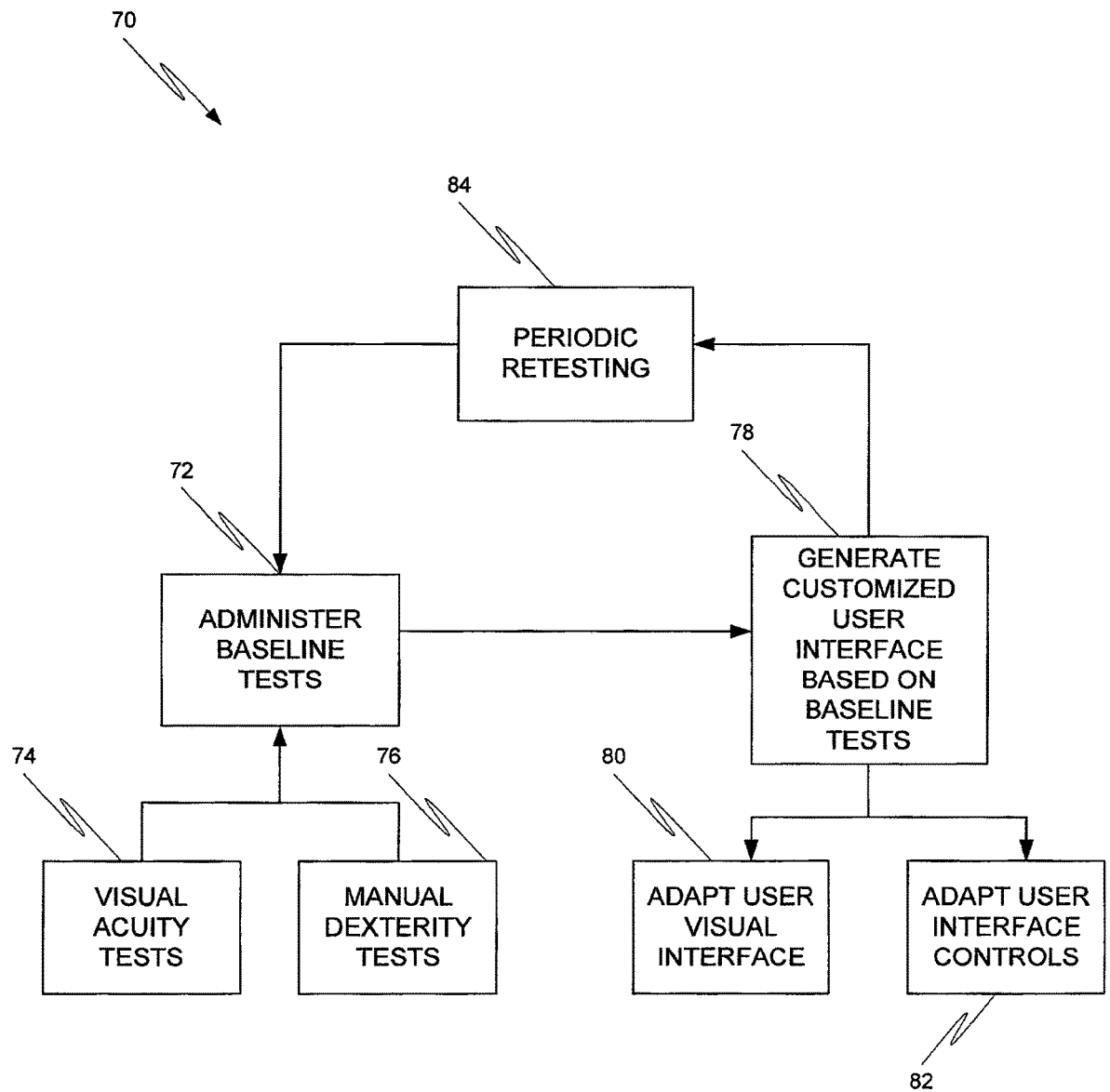
FIG. 3 is a flow diagram depicting a process of generating a customized user interface based on baseline testing that includes periodic retesting.

FIG. 3 is a flow diagram depicting a process of generating a customized user interface based on baseline testing that includes periodic retesting. The process of FIG. 3 is similar to the process described with reference to FIG. 2. One or more baseline tests are administered to a new user as shown at 72. These baseline tests may include visual acuity tests 74 and manual dexterity tests 76. Based on results of the administered baseline tests, a customized user interface is generated and provided to the user as shown at 78. The adaptive computer environment may adapt user visual interface settings 80 as well as user interface controls 82 to match the user computing abilities detected through the baseline tests. The example of FIG. 3 differs from that previously discussed with reference to FIG. 2 in that the example of FIG. 3 includes periodic retesting 84. Periodically (e.g., once a month, once every six months, once yearly), the user is prompted to retake the baseline tests to adjust the user environment to the user's current abilities. In another example, the retesting frequency may also be determined based on measured use-metric data. For example, if a user begins committing an unusual number of errors, an eye test may be readministered as the increase in errors may be caused by decreased vision. As a further example, if a user's computer use frequency diminishes, baseline testing may be readministered as the decrease in computer use may be a result of mounting frustration from inability to successfully navigate the computer environment. This retesting is useful in that it matches the computing environment to more current user ability measurements. This enables the adaptive computer environment to react to degradations in user abilities, such as those caused by aging, a degenerative condition, misplacing eyeglasses, etc., as well as improvements in user abilities, such as through healing, learning, improved eyeglasses, etc.

Figure 4:
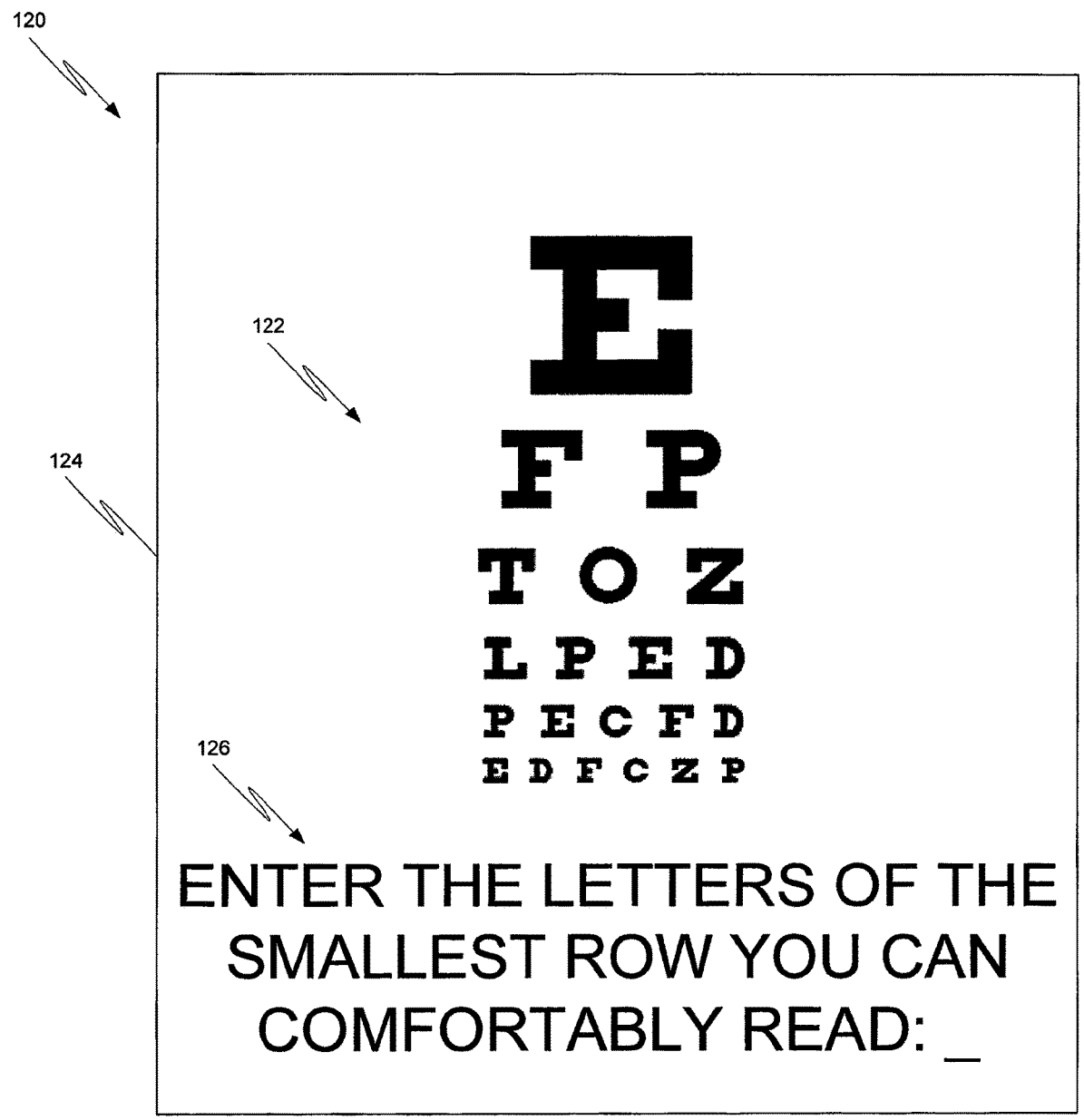
FIG. 4 is a depiction of an example eye test.

FIG. 4 is a depiction of an example eye test 120. As described above, an eye test may be administered to new users or periodically to continuing users to assess visual acuity. System settings such as a minimum text size and minimum icon size may then be set based on the eye test results. In the example eye test of FIG. 4, a set of letters 122 having rows of decreasing text size is presented to the user on a display 124. The user is also shown a prompt 126 directing the user to enter the letters of the smallest row that can be comfortably read. After response by the user, a visual acuity score is calculated for the user and stored in a data store. Certain parameters, such as a minimum icon size, a minimum text size, pointer size, etc., are adjusted based on the measured visual abilities and are incorporated into a customized user interface that is presented to the user.

Figure 5A:
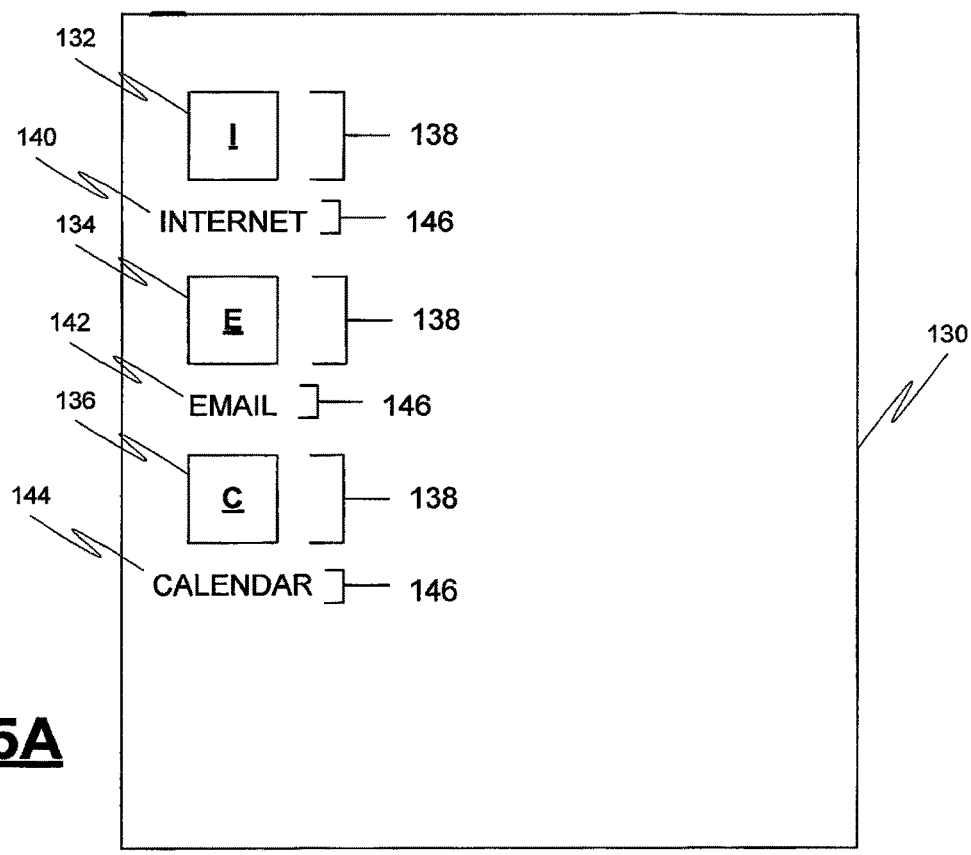
FIGS. 5A and 5B depict example customized user interfaces that are generated based upon results of an eye test.
Figure 5B:
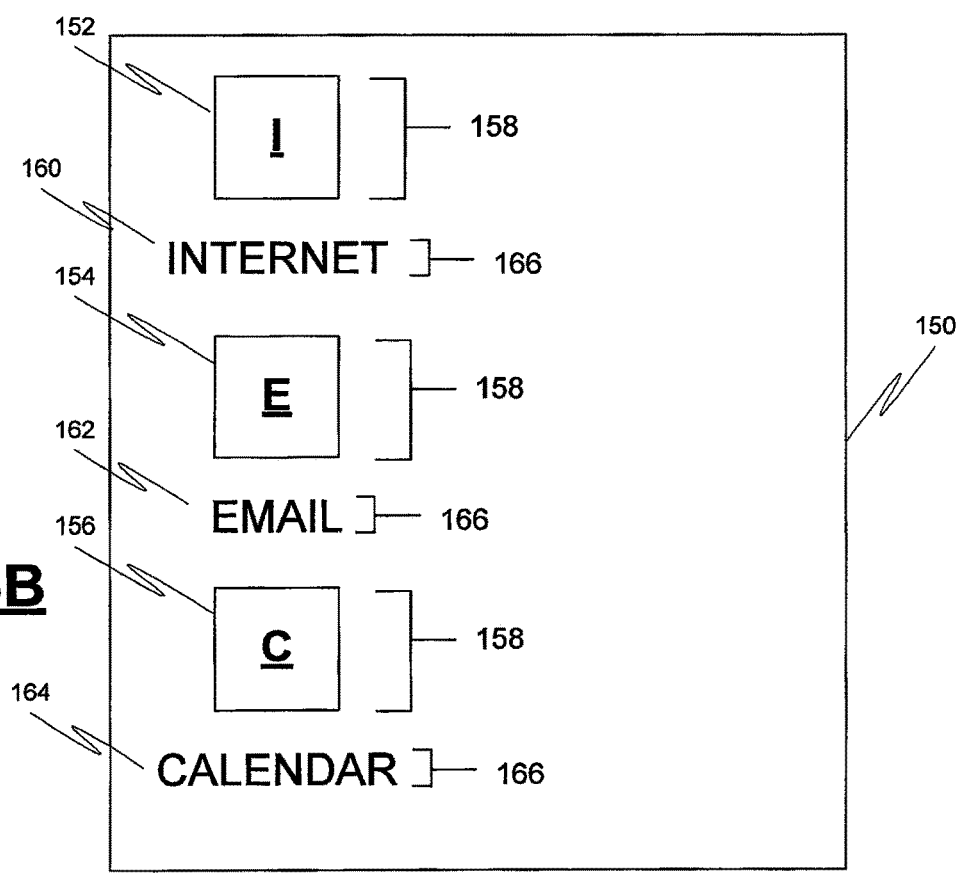

FIGS. 5A and 5B depict example customized user interfaces that are generated based upon results of an eye test such as the eye test depicted in FIG. 4. After administration of an eye test, a visual acuity score is calculated and parameters of a customized user interface are adjusted based on the visual acuity score. FIG. 5A depicts a display 130 customized for a user who demonstrates a high visual ability in an administered eye test. The three icons 132, 134, 136 are sized at or above a minimum icon size 138 set based upon the visual acuity score. Similarly, the three icon labels 140, 142, 144 are sized at or above a minimum text size level 146 that is also set based upon the visual acuity score.

FIG. 5B depicts a display 150 customized for a user who demonstrates a lower visual ability than the user presented with the display in FIG. 5A. Because of a lower visual acuity score attained by the FIG. 5B user, the three icons 152, 154, 156 are sized at or above a larger minimum icon size 158. Similarly, the three icon labels 160, 162, and 164 are sized at or above a larger minimum text size 166 to help compensate for the user's lower visual ability. In this way, a customized environment may be generated that offers compensation for low visual ability users but offers more efficient display usage for high visual ability users.

Figure 6:
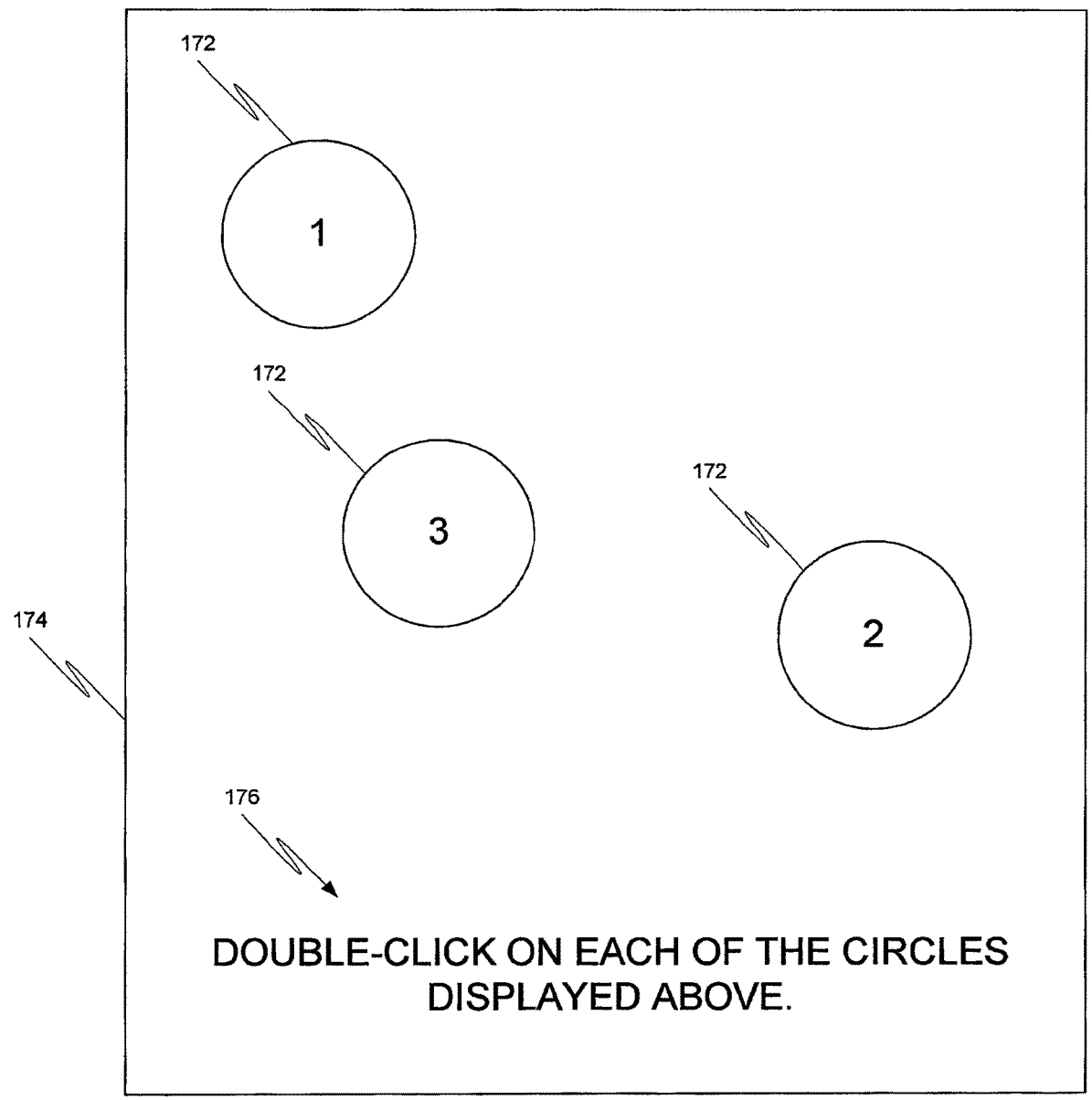
FIG. 6 is a depiction of an example mouse dexterity test.
Figure 6:
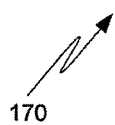

FIG. 6 is a depiction of an example mouse dexterity test. As described above, a manual dexterity test, such as a mouse dexterity test, may be administered to new users or periodically to continuing users to assess physical abilities. System settings, such as mouse speed, click footprints, click interpretations, etc., may then be set based on the mouse dexterity test results. In the example mouse dexterity test of FIG. 6, a set of circles 172 is presented to the user on a display 174. The display 174 also shows a prompt 176 instructing the user to double click on each of the circles. Mouse input is received from the user operating a pointing device, and one or more manual dexterity metrics are determined based on the received user input.

Figure 7:
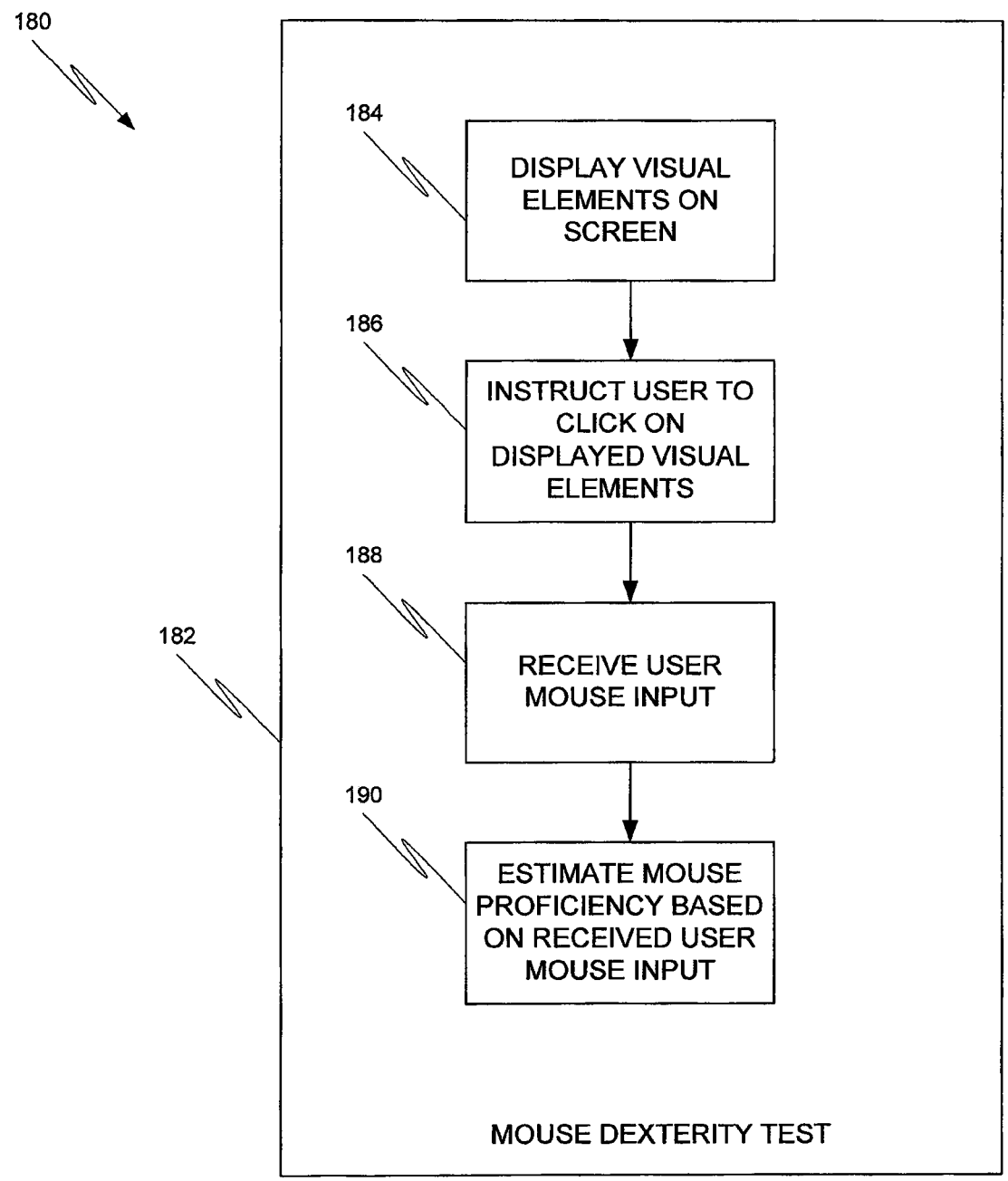
FIG. 7 is a flow diagram depicting a process for estimating a mouse proficiency based on a mouse dexterity test.

FIG. 7 is a flow diagram depicting a process for estimating a mouse proficiency based on a mouse dexterity test 182. The mouse dexterity test 182 begins at 184 where one or more visual elements are displayed on a screen. The user is then instructed at 186 to click on the displayed visual elements. The system receives the user's mouse movements in performing the requested task as shown as 188. One or more mouse proficiency metrics may then be calculated based on the received user mouse input at 190. These proficiency metrics may then be used to set one or more user interface control parameters.

For example, the speed at which the user moves among the displayed circles may be captured. This captured metric data may then be used to set a mouse speed that matches the user's mouse movement abilities. A proper mouse speed is beneficial, as too high of a mouse speed makes the pointer difficult for the user to track which may cause frustration. Conversely, too slow a mouse speed may increase the time it takes a more proficient user to perform desired activities, which may also cause frustration. Thus, a mouse speed setting may be set based on perceived mouse dexterity detected during baseline testing.

Figure 8A:
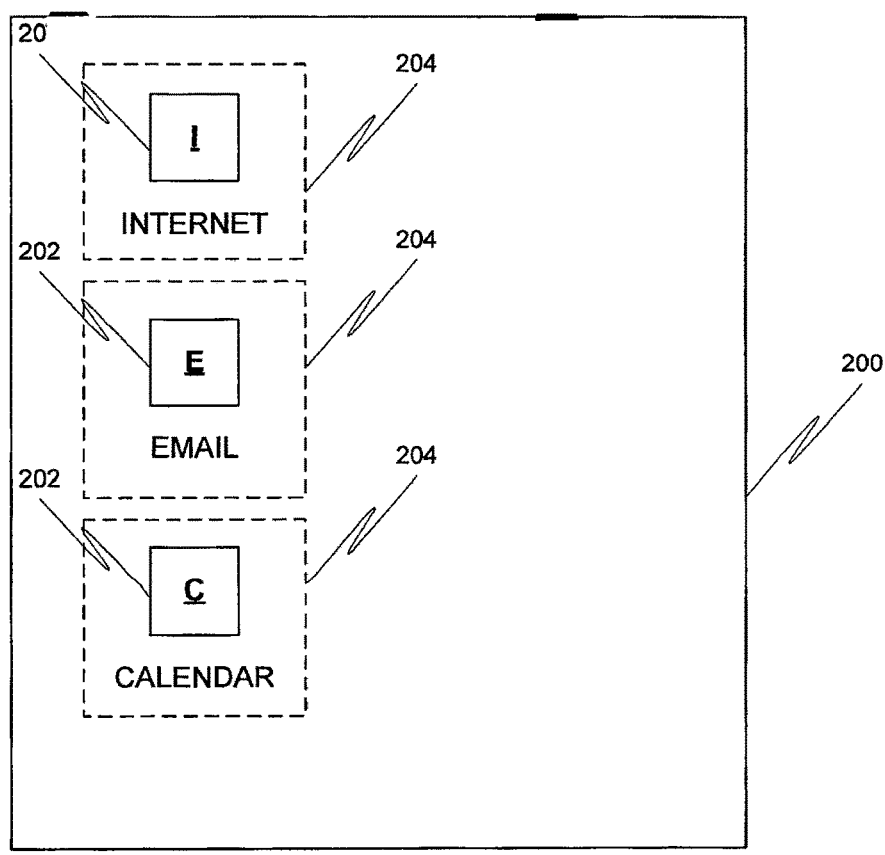
FIGS. 8A and 8B depict example customized user interfaces having click footprints sizes determined based upon a mouse dexterity test.
Figure 8B:
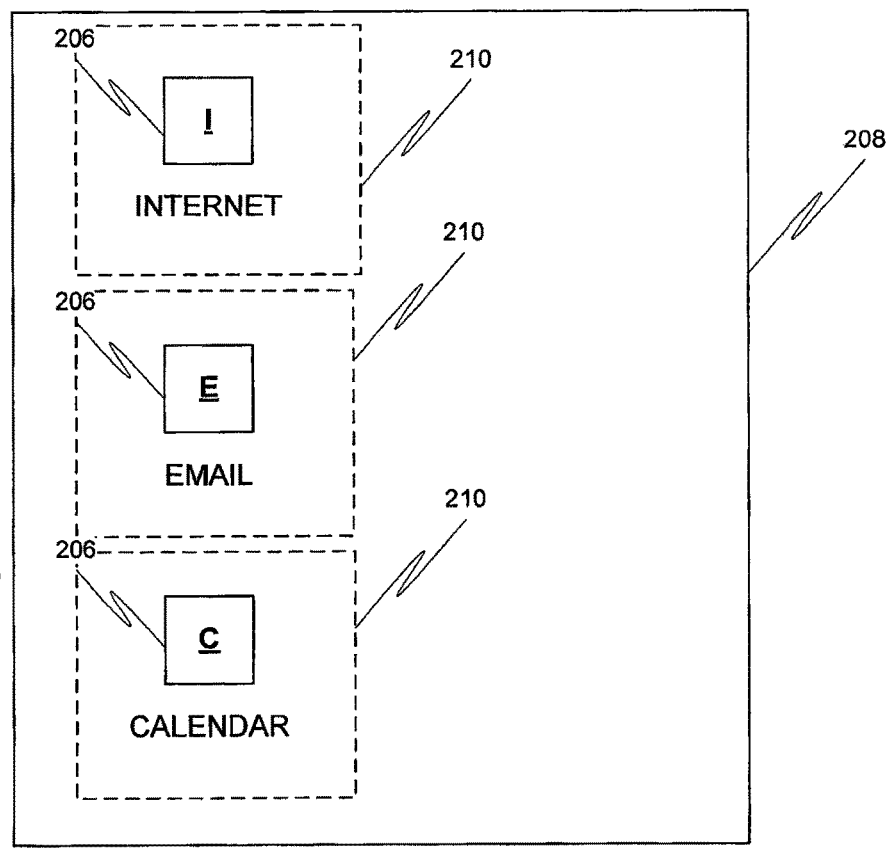

As another example, a click footprint size may be set based on measured mouse proficiency metric data. FIGS. 8A and 8B depict example customized user interfaces having click footprints sizes determined based upon a mouse dexterity test. A click footprint is the area around a user interface object in which a pointer click is associated with the user interface object. If the mouse pointer is within the click footprint of a user interface object when the mouse is clicked, then that click is associated with the user interface object. FIG. 8A illustrates click footprint settings for a user that has demonstrated a proficiency in mouse click accuracy as measured by the baseline testing. FIG. 8A depicts a display 200 that contains three icons and their associated icon texts 202. Also illustrated in FIG. 8A are the click footprints 204 associated with each of the icon/icon text pairings 202. These footprints 204 are denoted by the dotted line boxes 204 in FIG. 8A. These boxes 204 may not actually be shown on the display. If a user positions the pointer within one of the click footprints 204 and executes a mouse click, then that click will be associated with the icon 202 that resides within the click footprint 204.

FIG. 8B illustrates click footprints settings for a user who demonstrated a lower level of click accuracy in a mouse dexterity test. Icons and associated icon text are again shown on a customized display 208. Because the user shown the display 208 of FIG. 8B has demonstrated a lower mouse accuracy ability, larger click footprints 210 are provided for the user. These larger click footprints 210 enable clicks to be associated with nearby icons 206 despite the mouse pointer not being exactly on the icon. This can relieve a large amount of frustration for users who have difficulty with mouse accuracy. Large footprints may, however, require larger spacing between icons as shown in FIG. 8B. This may result in less efficient space usage on the customized user interface. Thus, matching click footprints to a user's ability is beneficial in that a user with lesser mouse accuracy may be presented with an environment that does not demand high pointing exactness, while a more proficient user may be presented a user interface having a higher space efficiency.

As a further example, click logic may be adjusted based on mouse proficiency measurements. For example, it may be detected during baseline testing that a user is not able to click only one mouse button at a time (e.g., the user clicks both the left and right mouse buttons when a left click is the proper response). Based on this detection, the mouse logic may be adjusted, for example, such that a click of multiple mouse buttons, such as both the left and right mouse buttons, at the same time is treated as a single left click. As another example, the baseline testing may show that a user is unable to hold the mouse pointer over a target user element throughout a single or double click (e.g., the pointer is on the target element on the click but moves off the target before release). The system may alter the click logic such that the pointer is made immobile during a click, or the system may interpret the depression of a pointer button over a valid target as a press and release over a valid target. Other pointer settings may also be adjusted based on baseline dexterity measurements.

Figure 9:
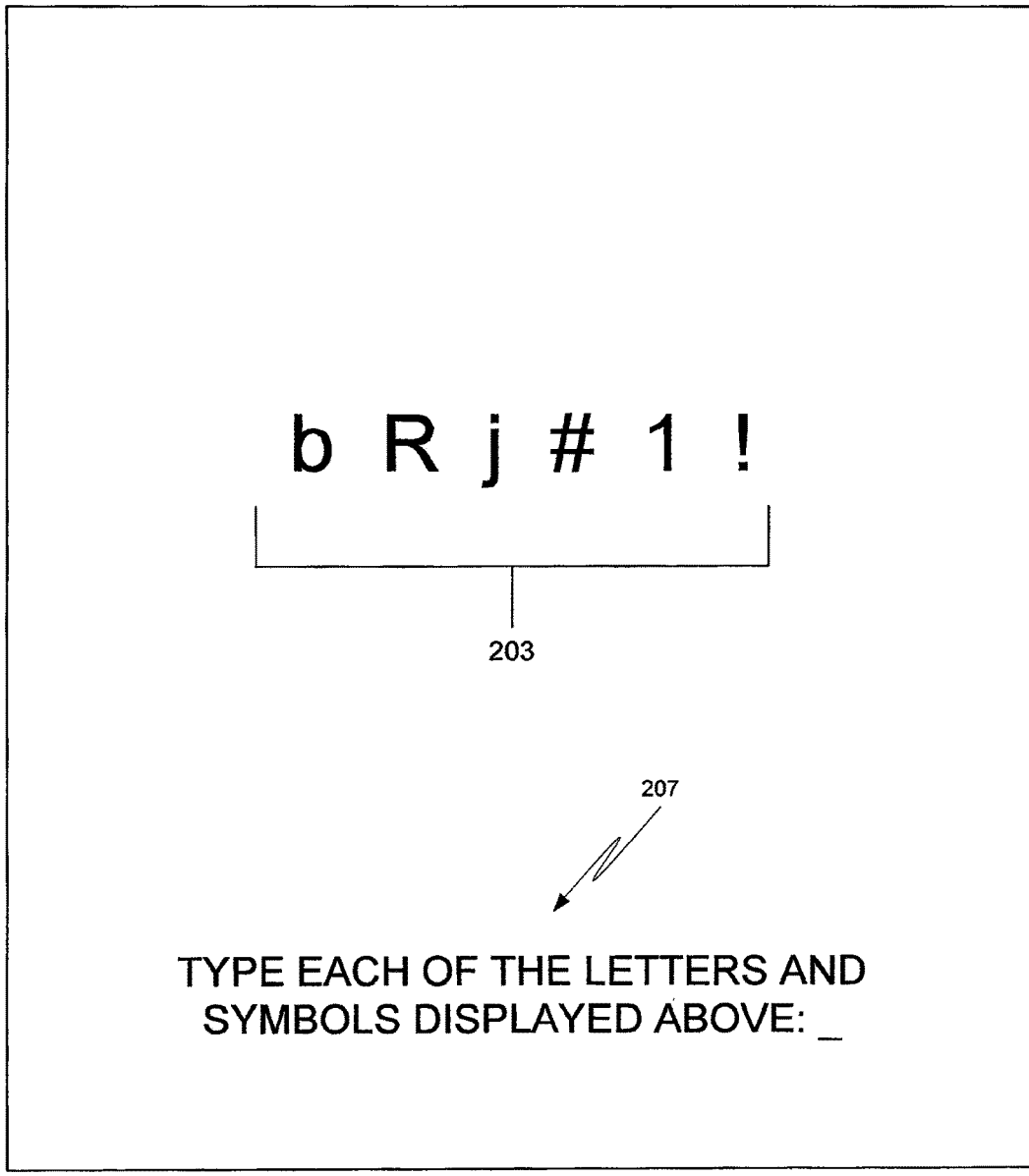
FIG. 9 is a depiction of an example keyboard dexterity test.

FIG. 9 is a depiction of an example keyboard dexterity test. As described above, a manual dexterity test, such as a keyboard dexterity test, may be administered to new users or periodically to continuing users to assess physical abilities. System settings such as keyboard mappings, keypress repeat rates, etc. may then be set based on the keyboard dexterity test results. In the example keyboard dexterity test of FIG. 9, a set of letters/numbers/symbols 203 is presented to the user on a display 205. The user is also presented with a prompt 207 instructing the user to type the displayed text 203. Keyboard input is received from the user, and one or more manual dexterity metrics are determined based on the received user input.

Figure 10:
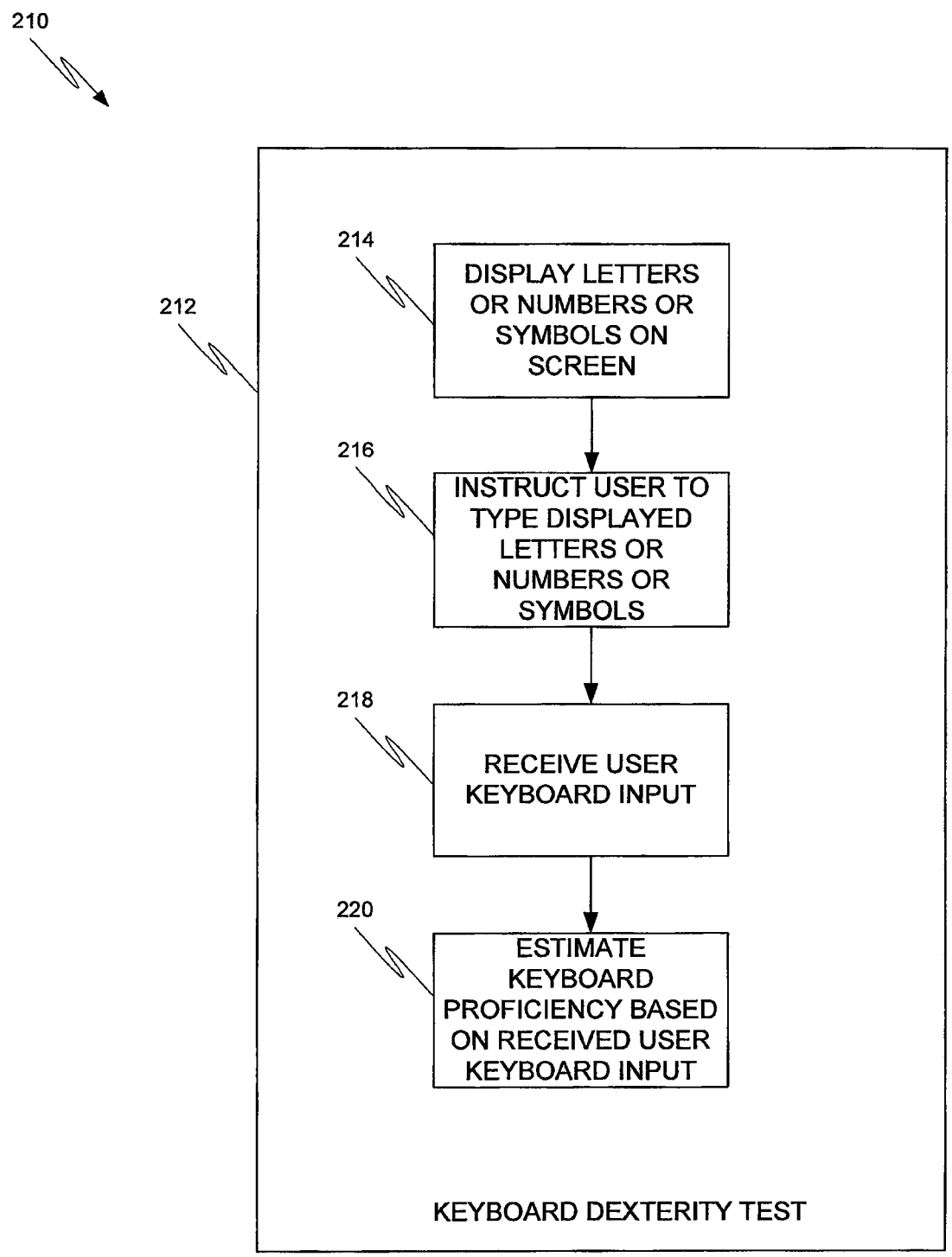
FIG. 10 is a flow diagram depicting a process for estimating a keyboard proficiency based on a keyboard dexterity test.

FIG. 10 is a flow diagram depicting a process for estimating a keyboard proficiency based on a keyboard dexterity test. The keyboard dexterity test 212 begins at 214 where one or more letters/numbers/symbols are displayed on a screen. The user is then instructed at 216 to type the displayed text. The system receives the user's keystrokes in performing the requested task as shown as 218. One or more keyboard proficiency metrics may then be calculated based on the received user keyboard input at 220. These proficiency metrics may then be used to set one or more user interface control parameters.

Figure 11:
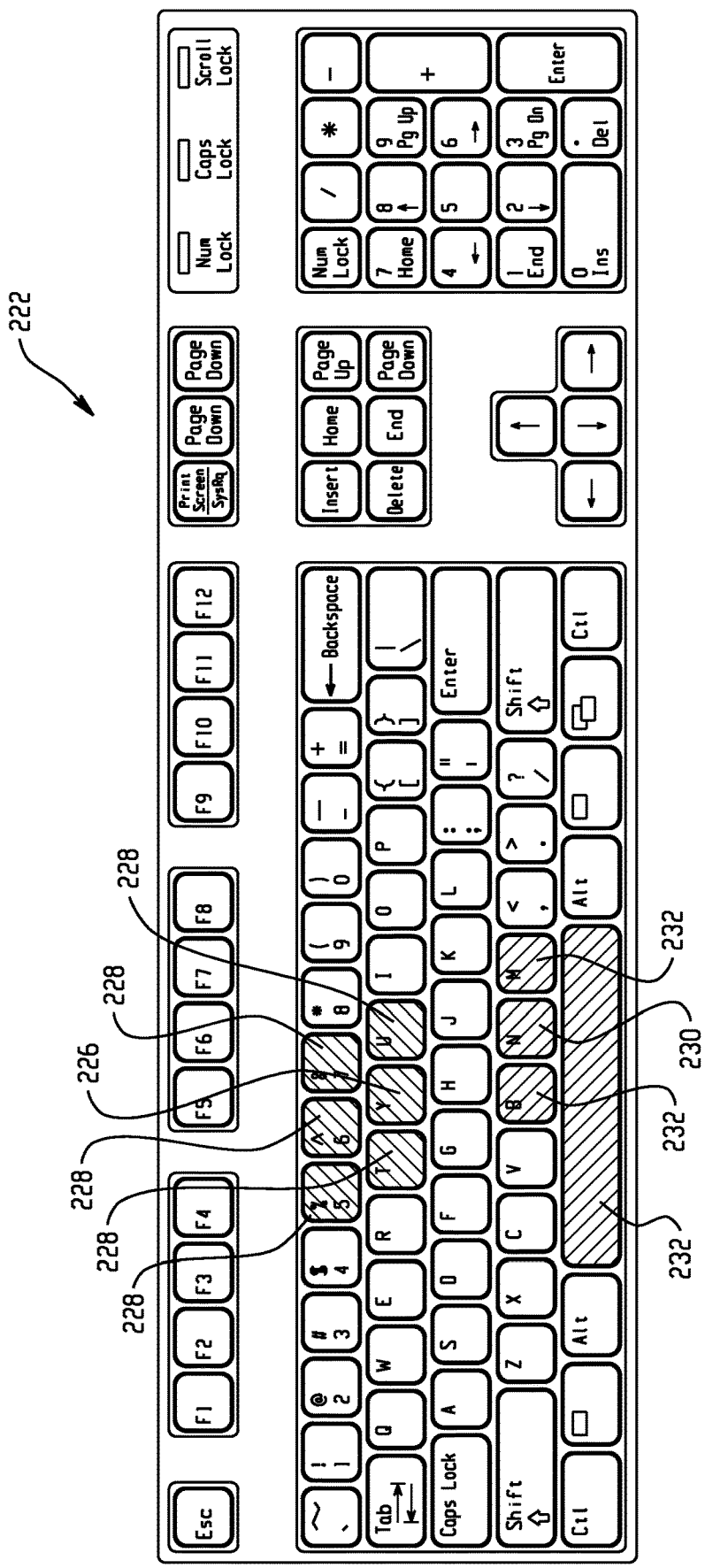
FIG. 11 depicts an example keyboard mapping based upon results of a keyboard dexterity test.

For example, keyboard mappings may be altered to aid users who display low keystroke accuracy in baseline testing. FIG. 11 depicts an example keyboard mapping 224 based upon results of a keyboard dexterity test. This keyboard mapping 224 may be applied after a determination that a user is not able to accurately press keys. This mapping 224 may be applied where a user is able to come close to pressing the right key (e.g., often presses a neighboring key), but usually fails to press the correct key.

The keyboard mapping 224 depicted in FIG. 11 enables input of Yes/No data without requiring 100% keystroke accuracy. Yes/No prompts may be provided to a user where pressing the 'Y' key 226 signals a 'Yes' selection. To compensate for keystroke accuracy deficiencies, the '5', '6', '7', 'T', and 'U' keys 228 that surround the 'Y' key 226 may be mapped to be recognized as a depression of the 'Y' key. Thus, a depression of any of the surrounding keys 228 will accomplish a 'Yes' selection despite a keystroke inaccuracy. Similarly, a depression of the 'N' key may signal a 'No' selection. To compensate for keyboard dexterity deficiencies, depressions the surrounding 'B', 'M', and spacebar may be mapped to be the 'N' key during Yes/No prompts. The modified keyboard mapping displayed in FIG. 11 is beneficial in that it may enable users who are unable to accurately use a keyboard to still enter meaningful input to Yes/No questions via a keyboard.

This mapping would not be beneficial for all users at all times because this mapping limits the number of diverse keyboard inputs that can be made (e.g., '5', '6', '7', 'T', 'U', 'B', 'M', and spacebar inputs can not be recognized in this mapping). Thus, users who exhibit good keyboard dexterity may never be offered this mapping, and users with poor dexterity may only be offered this mapping when Yes/No questions are presented.

Other keyboard data entry parameters may be adjusted based on baseline testing. For example, users who tend to hold down keys too long may have the keypress repeat time lengthened. For example, characters may begin repeating when a key is depressed for 5 seconds rather than 3 seconds to avoid unintended repeats. If a user shows very poor keyboard dexterity, keyboard input may be disabled completely to avoid erroneous inputs.

Figure 12:
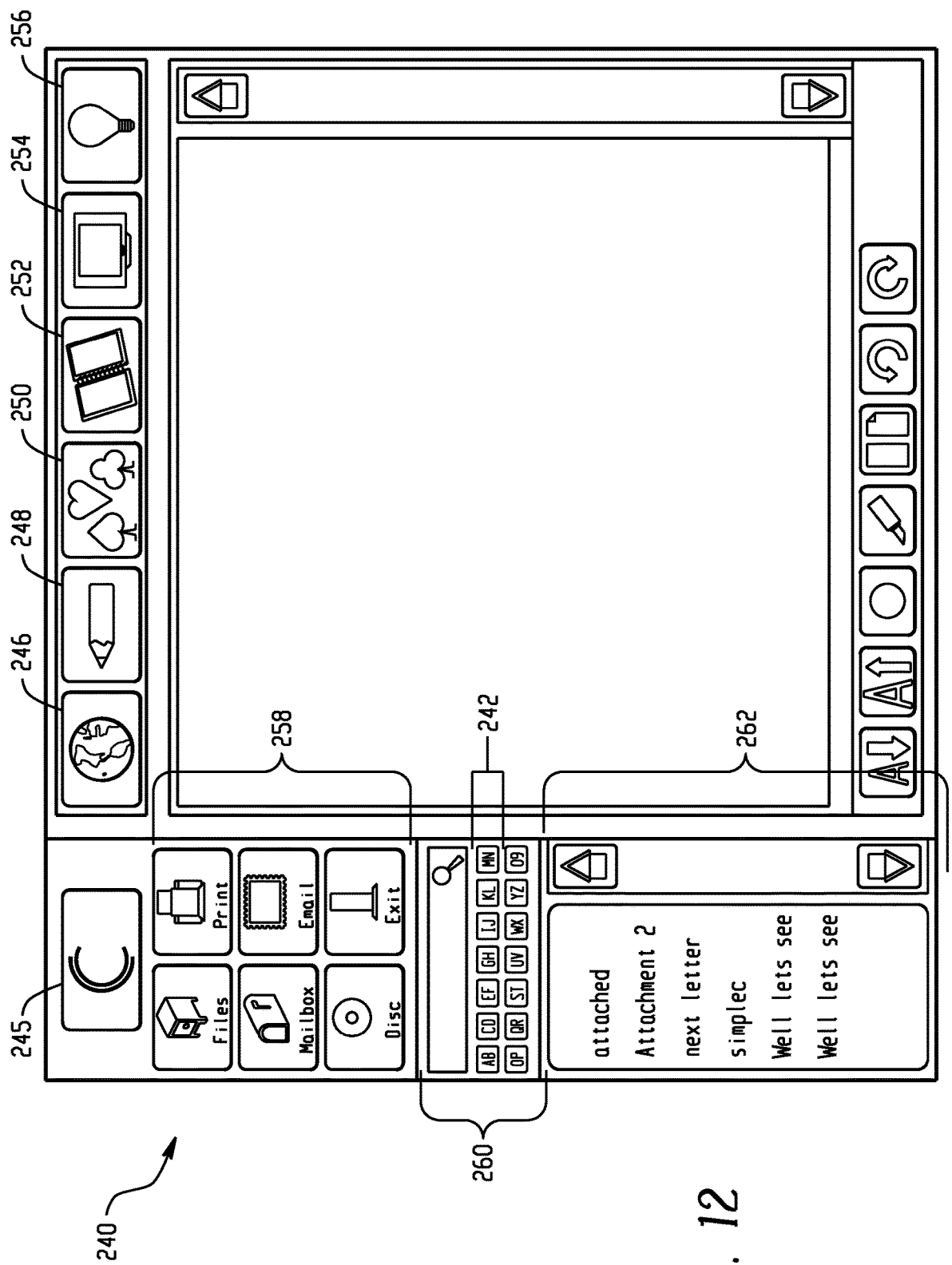
FIG. 12 is a depiction of an example customized user interface.

FIG. 12 is a depiction of an example customized user interface 240. Certain features of the customized user interface 240 may have been set based on the results of administered baseline tests. For example, a minimum icon size 242 or a minimum text size 244 may be applied based on results of an eye test. Additionally, certain user interface controls such as mouse speed and keypress repeat rates may be set according to input dexterity tests.

In addition to improving visual interface usability through individual customization, a user interface may promote muscle memory through implementation of a locked down interface. Muscle memory is the association of certain physical movements with a thought. For example, when pressing the breaks suddenly in a car, a driving parent may automatically reach across the passenger seat to protect a passenger child. Similarly, muscle memory may be developed in a computing environment.

Muscle memory may be developed, for example, through the implementation of a locked down environment. In a locked down environment, certain screen features always remain in the same place on the screen. For example, after baseline testing, the customized user interface 240 of FIG. 12 is generated. Once the customized user interface 240 is generated, certain screen elements are locked into place such that they cannot be altered or moved by the user. For example, in FIG. 12, seven shortcut icons are positioned across the top of the screen. These icons correspond to: accessing help information 245, accessing the internet 246, accessing a word processor 248, accessing a games menu 250, accessing a calendar 252, accessing a media player 254, and accessing a note pad 256. Similarly, other icons and features may be locked down such as the control icons depicted at 258, the search function shown at 260, and the recent documents listing shown at 262.

In a locked down environment, the seven top screen shortcut items 245, 246, 248, 250, 252, 254, 256 remain in the same position at all times, where they could not be moved or manipulated by the user. For example, the help access icon 245 would always be the left-most icon, and the access note pad icon 256 always remain in the top-right corner. Thus, when a user wishes to access help, their hand will automatically move the mouse (or other pointing device) towards the top-left corner of the screen. Similarly, when the user wishes to access the note pad, their hand will automatically move the mouse towards the right-most top icon 246.

The development of muscle memory through the use of a locked down user interface is beneficial, especially in users with diminishing abilities. A user with diminishing mental capacity, such as through aging, may have difficulty accessing the internet in an environment where the user must think about which icon provides access to the internet and then must search for that icon on the user environment. Through the development of muscle memory, the location associated with accessing the internet becomes engrained in the user's brain such that movement of the mouse towards the internet access icon becomes automatic when a decision to access the internet is made by the user. Thus, the process of accessing the internet becomes a subconscious activity rather than an activity that requires active thinking. This development of muscle memory may allow a user with diminishing mental capability to continue to access the functions associated with that muscle memory, where that access might not be possible in an unfamiliar or changing environment that requires active thinking. The combination of an environment that encourages the development of muscle memory in combination with a user interface customized to a user's physical and mental capabilities may have a synergistic effect that further promotes successful computer usage.

Figure 13A:
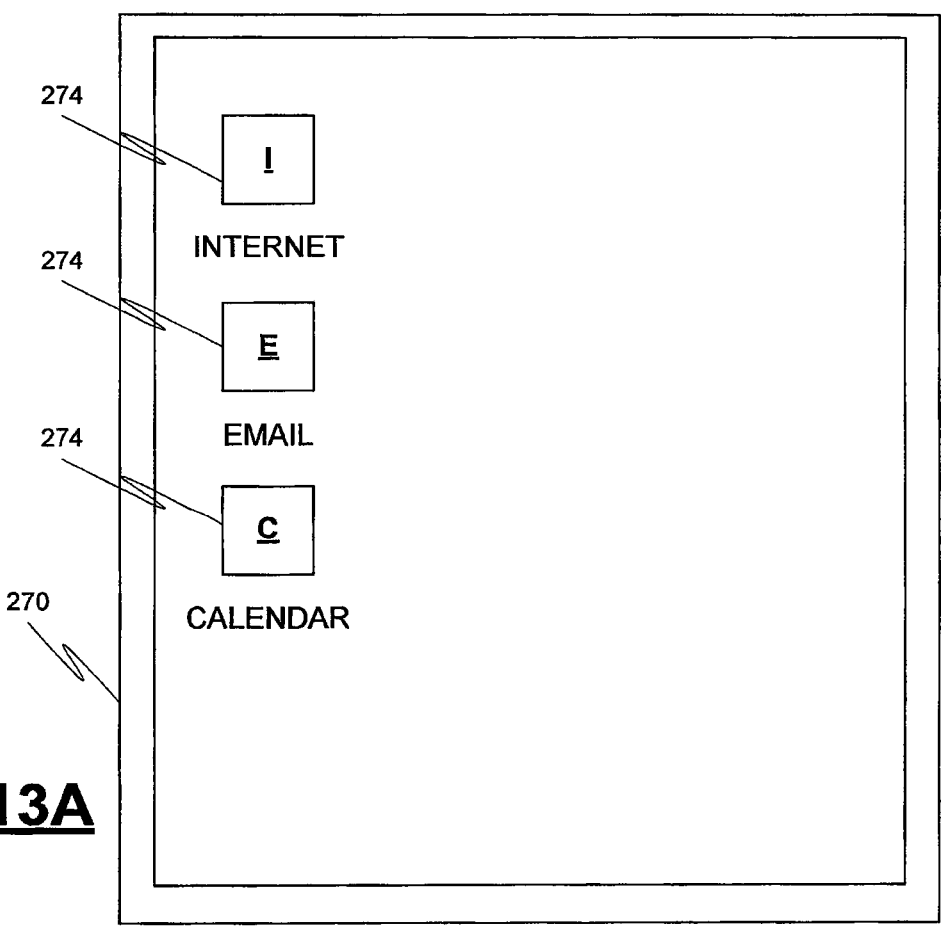
FIGS. 13A and 13B depict a locked down computer interface where icons maintain their relative position despite varying display sizes.
Figure 13B:
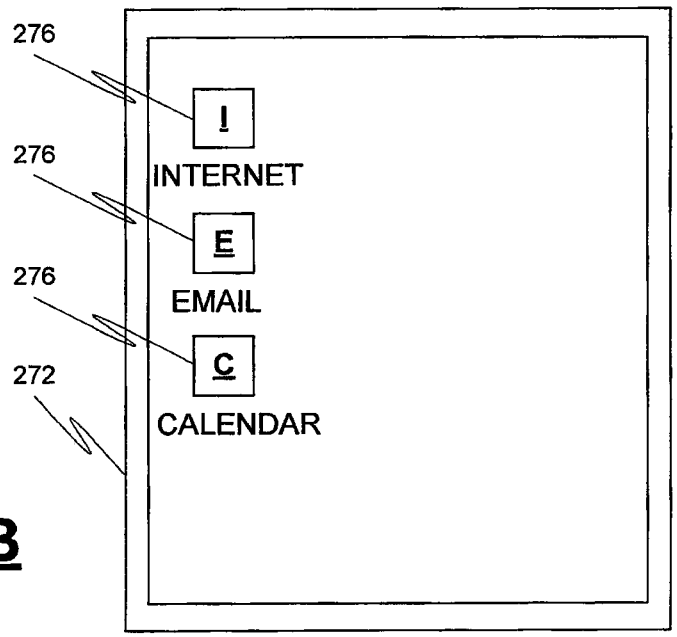

FIGS. 13A and 13B depict a locked down computer interface where icons maintain their relative position despite varying display sizes. The scenario of varying display sizes may occur in a number of different situations. For example, all computers connected to an adaptive computing environment in a computer lab may not have the same size monitor. Thus, if a user logs onto a different computer during a different session, the user may be working with a different size computer monitor. Similarly, if a user works on a laptop at work and a desktop at home, where both are connected to an adaptive computing environment, the user may be working with different sized displays.

FIGS. 13A and 13B illustrate the locking down of computer interface elements for a user working on two different sized displays 270, 272. In order to continue to develop muscle memory despite work on different displays, the icon ordering and positioning remains the same for the icons 274 of FIG. 13A as the icons 276 of FIG. 13B. Thus, the internet icon remains in the top left position despite display size, and the email icon remains immediately below the internet icon followed by the calendar icon. This continuity enables the user to continue developing muscle memory associations despite utilization of different sized displays.

Figure 14A:
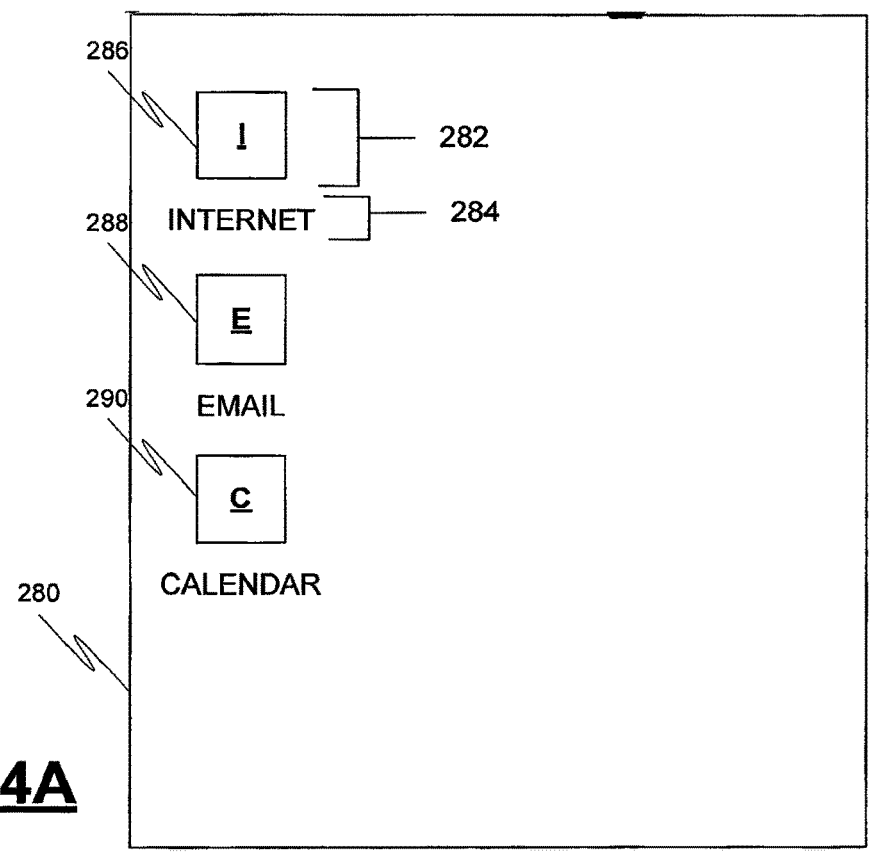
FIGS. 14A and 14B depict a locked down computer interface where icons maintain their relative position despite changes to minimum text size and minimum icon size attributes.
Figure 14B:
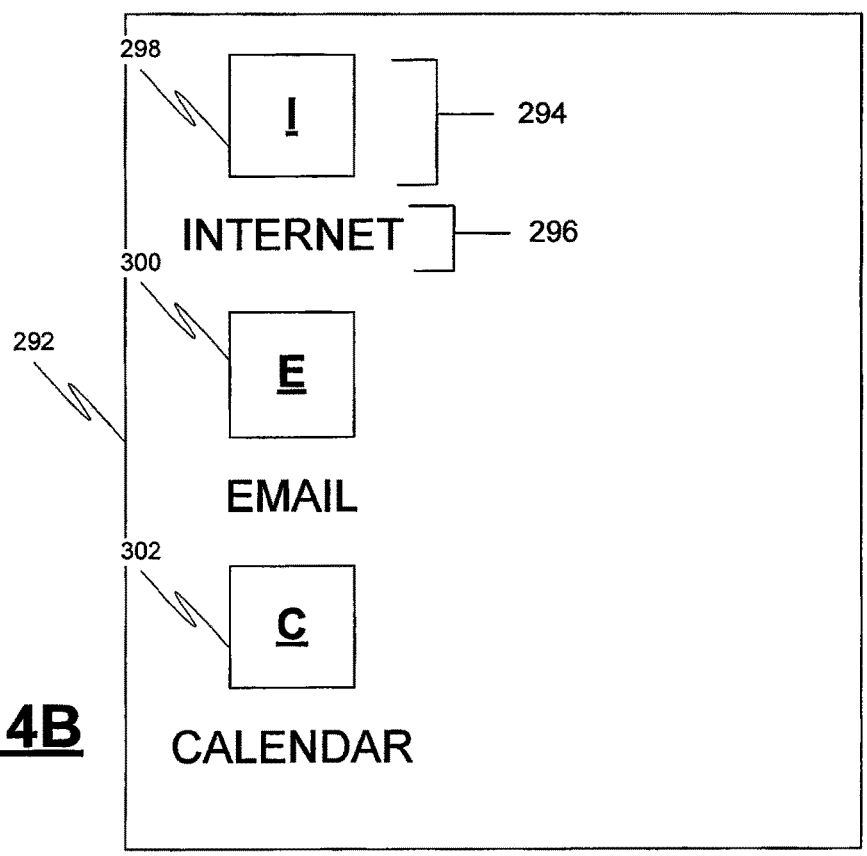

FIGS. 14A and 14B depict a locked down computer interface where icons maintain their relative position despite changes to minimum text size and minimum icon size attributes. Minimum text size and minimum icon size attributes may be changed, for example, after re-administration of a baseline eye test. If a user's eyesight has deteriorated, the minimum icon and minimum text sizes may be increased in the generated user display. However, muscle memory learned using a first minimum icon/text size need not be lost due to a later change in minimum icon and minimum text sizes. This is illustrated in FIGS. 14A and 14B. FIG. 14A illustrates a first display 280 having a first minimum icon size 282 and first minimum text size 284. In this generated user display an internet icon 286 resides in the top left corner of the display 280. An email icon 288 sits below the internet icon 286 followed by a calendar icon 290. Through use of the locked down display 280, the user may develop muscle memory associated with the icon locations.

FIG. 14B illustrates a generated user interface 292 for the same user after an increase in minimum icon size 294 and minimum text size 296. While the change in icon and text sizes may necessitate some absolute movement of user interface elements, some muscle memory developed through use of the first display 280 may be preserved by maintaining the relative positioning of user interface elements. In the example of FIG. 14B, the internet icon 298 remains in the upper left corner. The email icon 300 and the calendar icon 302 maintain their relative positioning below the internet icon 298 such that as few changes as possible are made to the generated display provided to the user. Thus, the modified display 292 shown in FIG. 14B compensates for the user's lower measured visual acuity while still maintaining as much muscle memory benefits as possible.

Figure 15:
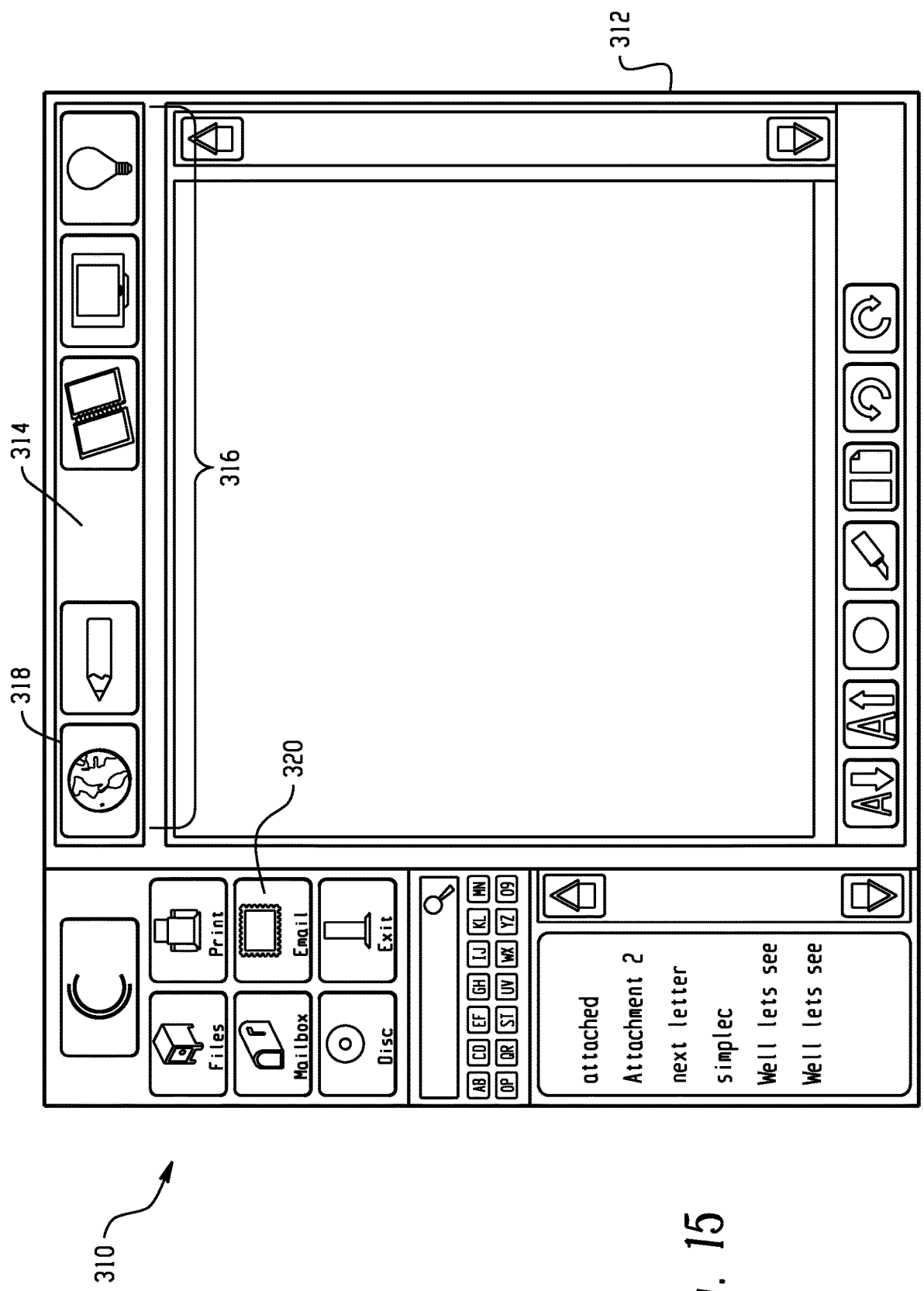
FIG. 15 is a depiction of an example generated user interface that adaptively displays icons based on based on stored content.

FIG. 15 is a depiction of an example generated user interface 312 that adaptively displays icons based on stored content. The generated user interface 312 of FIG. 15 is similar to the user interface shown in FIG. 12. One significant difference is the non-display of the 'Games' icon 314 in the top set of icons 316. The adaptive computing environment system may determine which icons and other user interface objects should be displayed in a generated user interface 312. For example, the system may examine applications and files on the computer to determine if certain categories of files exist on the computer. Icons and user interface features associated with empty categories may not be displayed on a generated user interface. In the example of FIG. 15, after a determination that no games are present on the system, a decision to not display the 'Games' icon 314 on the generated user interface is made by the adaptive computing environment.

As another example, if a determination is made by the adaptive computing environment that a computer is not connected to the internet, the user interface generated and provided to the user may not include the internet icon 318 and/or the email icon 320. As a further example, a user on a computer which holds only one picture would not be offered an option to create a photo album. Additionally, a user would not be offered the option to create a music playlist if the computer only contains one song. In communications, a user would not be offered the ability to create a group of contacts if they only possess contact information for one entity. In a display box, an option to view more or another page of objects would not be offered unless there exists a larger number of objects than would fit inside of the display box. Because these scenarios may cause confusion, options to perform these function may be omitted unless they can be meaningfully used by the user.

The omission of these icons and other user interface objects helps to avoid user frustration by limiting available options to those for which meaningful interaction is possible. If the user has no games, the inclusion of a 'Games' icon that links to an empty 'Games' list may invoke confusion and frustration. By not including certain likely invalid or low utility user interface elements, the number of interface elements that a user must process is lessened and the user's attention is directed to valid interface element options, which increases ease of use and understanding.

Figure 16:
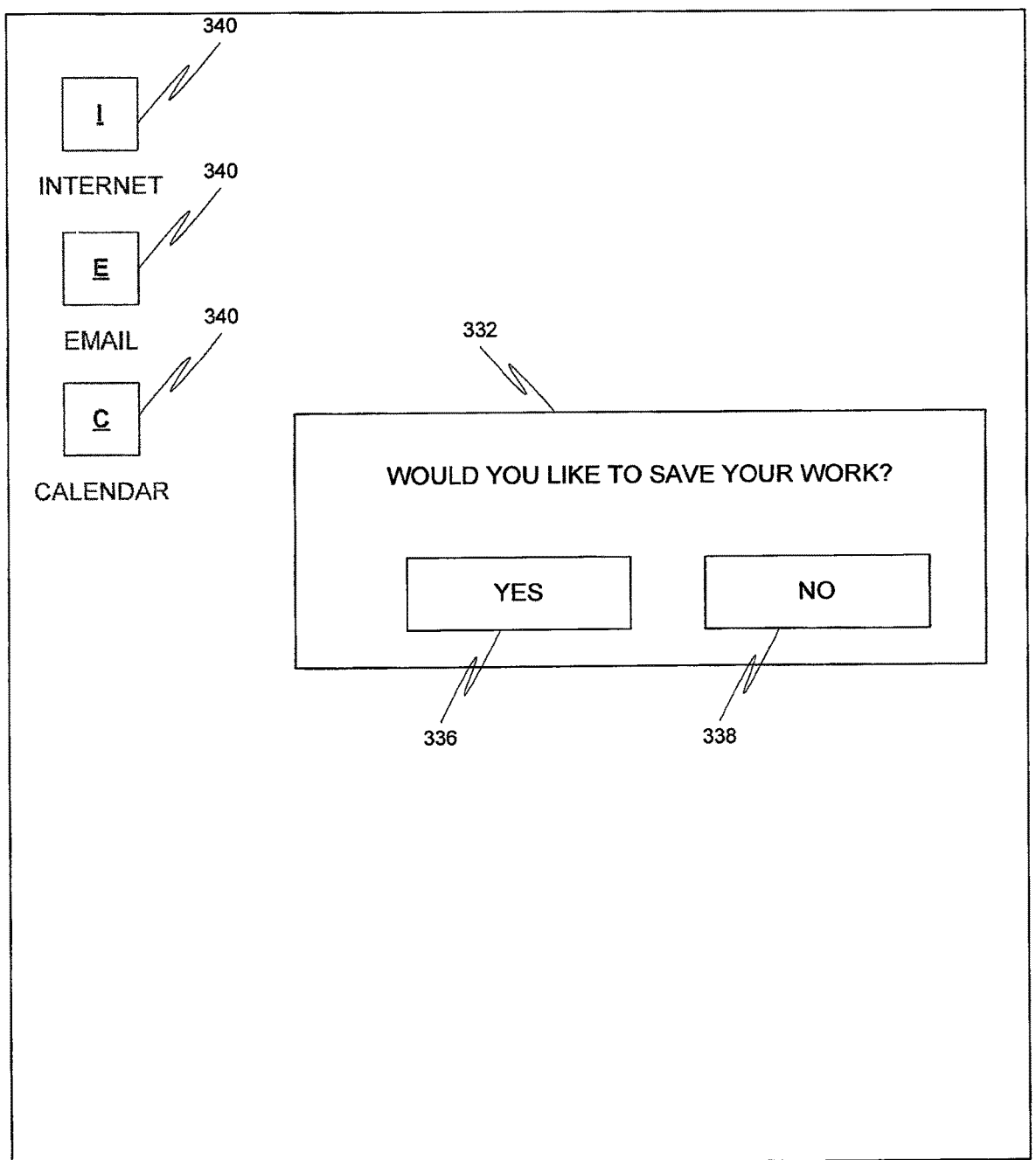
FIG. 16 depicts user attention direction to interface objects available for selection.

FIG. 16 depicts user attention direction to interface objects available for selection. In this example, a 'Save Changes' prompt 332 is provided to a user in a display 334. Valid inputs at this point in time consist mainly of clicking the 'Yes' 336 or 'No' 338 buttons in the prompt 332. A user may, however, be confused by other user interface elements such as icons for other applications 340 that may be visible in addition to the prompt. To help avoid confusion and to help direct the user's attention to valid input options, invalid user interface options may be grayed, blurred, hidden, etc. such that the user's attention and vision are likely to be drawn to the valid input options. This is illustrated in FIG. 16 where the other visible icons 340, which are not valid inputs, are grayed such that attention is drawn to the valid 'Yes' 336 and 'No' buttons in the 'Save Changes' prompt 332.

Figure 17:
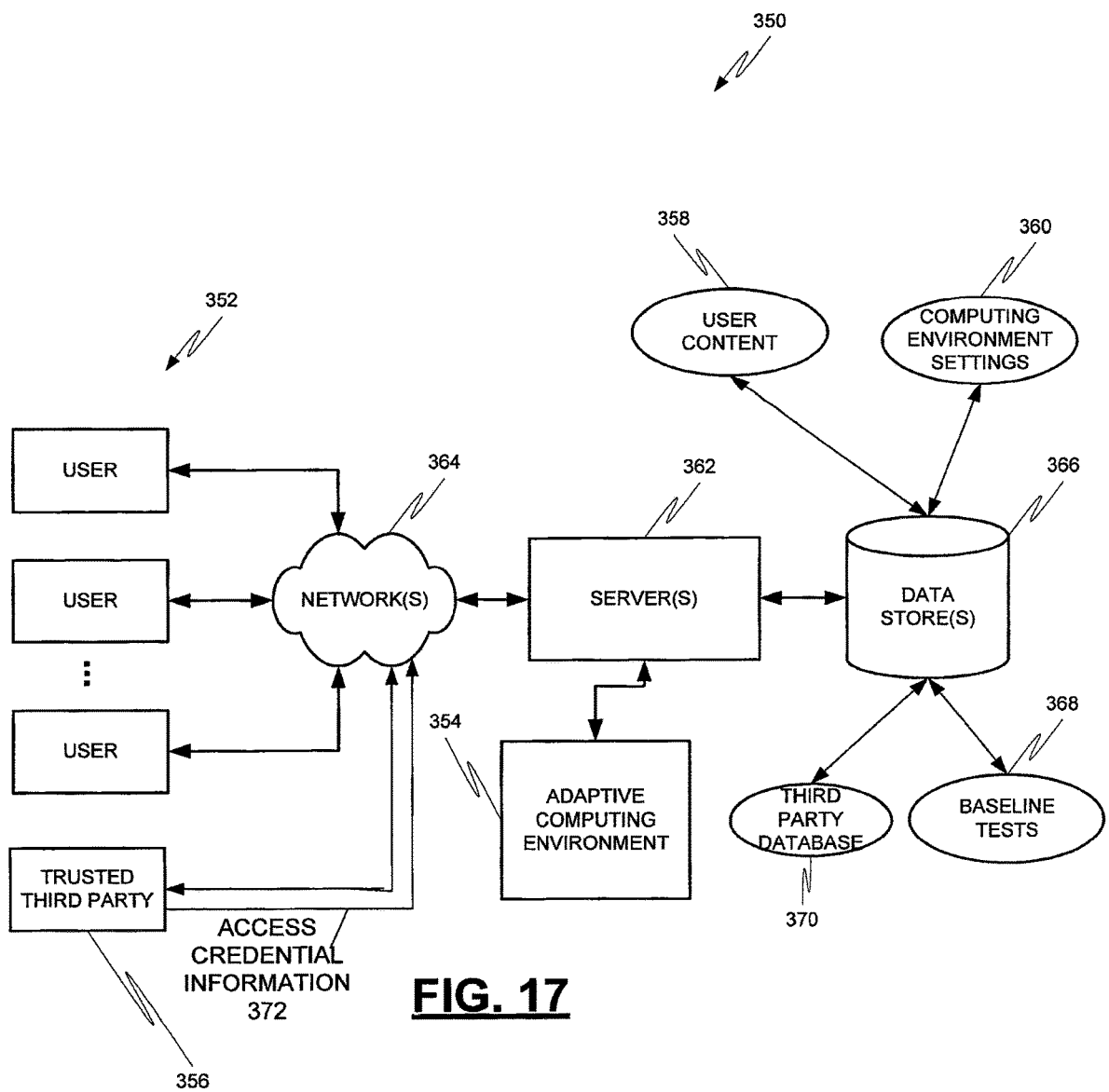
FIG. 17 is a block diagram depicting a computer-implemented environment wherein users can interact with an adaptive computing environment, where a trusted third party may upload content and modify user settings.

FIG. 17 is a block diagram depicting a computer-implemented environment 350 wherein users 352 can interact with an adaptive computing environment 354, where a trusted third party 356 may upload user content 358 and modify user settings 360. Users 352 may interact with the adaptive computing environment 354 that may be housed on one or more servers 362 via one or more networks 364. The adaptive computing environment is responsive to one or more data stores 366 that house a set of baseline tests 368, customized computing environment settings 360 for individual users, as well as stored user content 358, and a third party database 370 containing third party permissions.

A user 352 may interact with the adaptive computing environment 354 by identifying himself to the system, such as through a log-in procedure. (In a standalone system, such as a personal computer that houses the adaptive computing environment locally, a log-in may not be necessary.) The adaptive computing environment 354 may administer one or more baseline tests 368 to the user 352 to determine physical and mental ability metric data which may be stored in the one or more data stores 366. These baseline tests 368 may be administered to all new users 352 and may be re-administered periodically to gauge any changes in user 352 ability. Baseline testing results are used to adjust computing environment settings 360 to tailor interface appearance and input controls to measured user abilities. After completion of baseline testing, a customized user interface is provided to the user 352 using the stored computing environment settings 360 for that user 352.

In addition to users 352 interacting with the adaptive computing environment 354, a system may be provided that allows trusted third parties 356 to interact with the adaptive computing environment 354. Trusted third parties may include relatives, friends, financial advisors, medical providers, technical support personnel, etc. Trusted third parties 356 may interact with the environment 354 over the same or different network 364 as the users 352. The trusted third party 356 may be required to provide access credential information 372 to access the adaptive computing environment 354. The access credential information 372 may come in a variety of forms such as a username and password, a secure certificate, a response to a challenge question, a fingerprint, a retinal scan, etc. Entered access credential information 372 is compared to records stored in the third party database 370 to determine permissions allotted to the accessing trusted third party 356. After presentation of proper access credential information 372, a trusted third party 356 may be presented with a third party interface that enables the trusted third party 356 to perform actions for which the trusted third party 356 has been granted permissions.

A trusted third party 356 may be able to interact with the generated user experiences in a variety of ways depending on permissions granted to the trusted third party 356. For example, a trusted third party may be permitted to upload a variety of types of user content 358. Uploadable content may include pictures, videos, calendar entries, documents, email addresses, contact information, favorite websites, etc. The ability of trusted third parties 356 to upload content is helpful in many instances because uploading certain types of content may be difficult or error prone. For example, uploading pictures and/or from a digital camera may be difficult, confusing, or frustrating to a user having diminished physical or mental capacities. As another example, entering email addresses, website addresses, and calendar data may be confusing and error prone for certain users.

The ability of trusted third parties to upload these types of content may alleviate frustration for impaired users. In addition, the ability of trusted third parties to participate in a user's computing experience facilitates communication and interaction between the trusted third party and a user. For example, a grandchild living in Pittsburgh may upload pictures taken at a high school soccer game to a grandparent's user environment, where the grandparent lives in San Diego. As another example, a doctor may be able to upload reminders for appointments or medication times to a user's calendar such that reminders of important dates and times are provided to a user. As a further example, a best friend may upload a favorite website to a user's environment that he would like the user to view. Additionally, knowledgeable trusted third parties such as technical support personnel or computer savvy relatives or friends may be granted permission to edit user computing environment settings to troubleshoot problems or to further customize a generated user computing experience.

Figure 18:
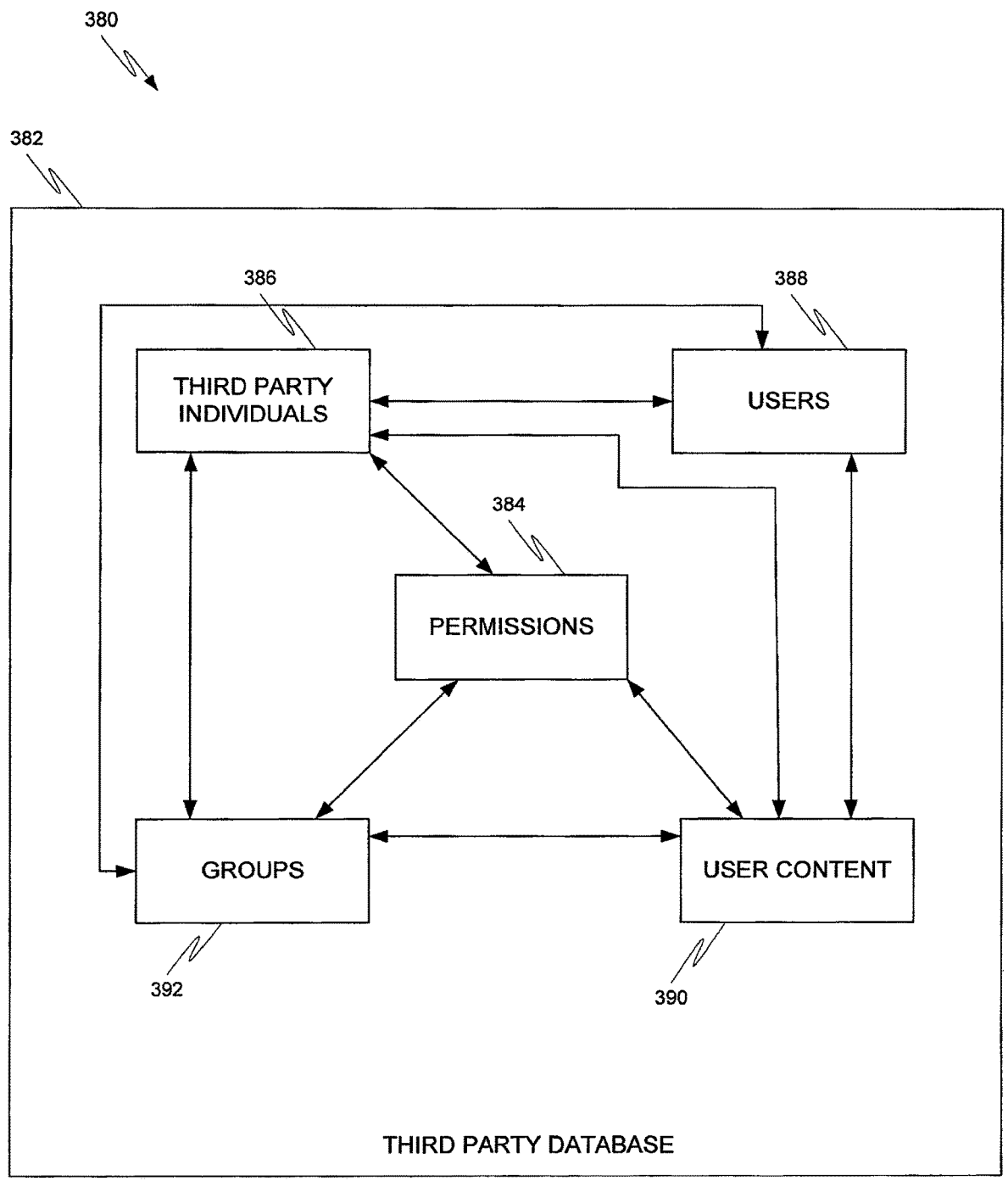
FIG. 18 is a block diagram depicting entities and relationships among entities stored in a third party database.

FIG. 18 is a block diagram depicting entities and relationships among entities stored in a third party database 382. The third party database 382 contains a set of third party permissions 384 for activities such as uploading content or modifying computing environment settings. Trusted third party individuals 386 may be associated with certain users 388. For example, a niece may be associated with her aunt in a trusted third party-user relationship. If appropriate permissions 384 are present, a trusted third party 386 may upload/edit user content 390 and computing environment settings for a user 388 with which the third party individual 386 is associated.

additionally, the third party database 382 may track groups 392 and permissions 384 associated with the groups 392. Groups are made up of users 388, third party individuals 386, or a combination of the two. Permissions 384 may be associated with groups 392 that grant/or deny access to certain aspects of computing environments of users 388 with which the group 392 is associated.

For example, a set of third party individuals 386 that are family members of a user 388 may be associated in a group 392. The family members group 392 may be granted permissions 384 to upload certain types of user content 390, such as digital pictures, to the computing environment of the user 388 with which the family group 392 is associated. Additionally, family members may be authorized to update certain contact information such as changes in email addresses or physical addresses or to announce the birth of new children. As another example, a set of users 388 may be associated with a bird watching group 392. Users in the bird watching group 392 may be granted permissions 384 to upload websites of interest to other users 388 associated with the bird watching group 392. As a further example, members of an adaptive computing environment technical support staff may be associated with a technical support group 392. The technical support group 392 may be granted permissions 384 to modify computing environment settings for all users 388.

Figure 19:
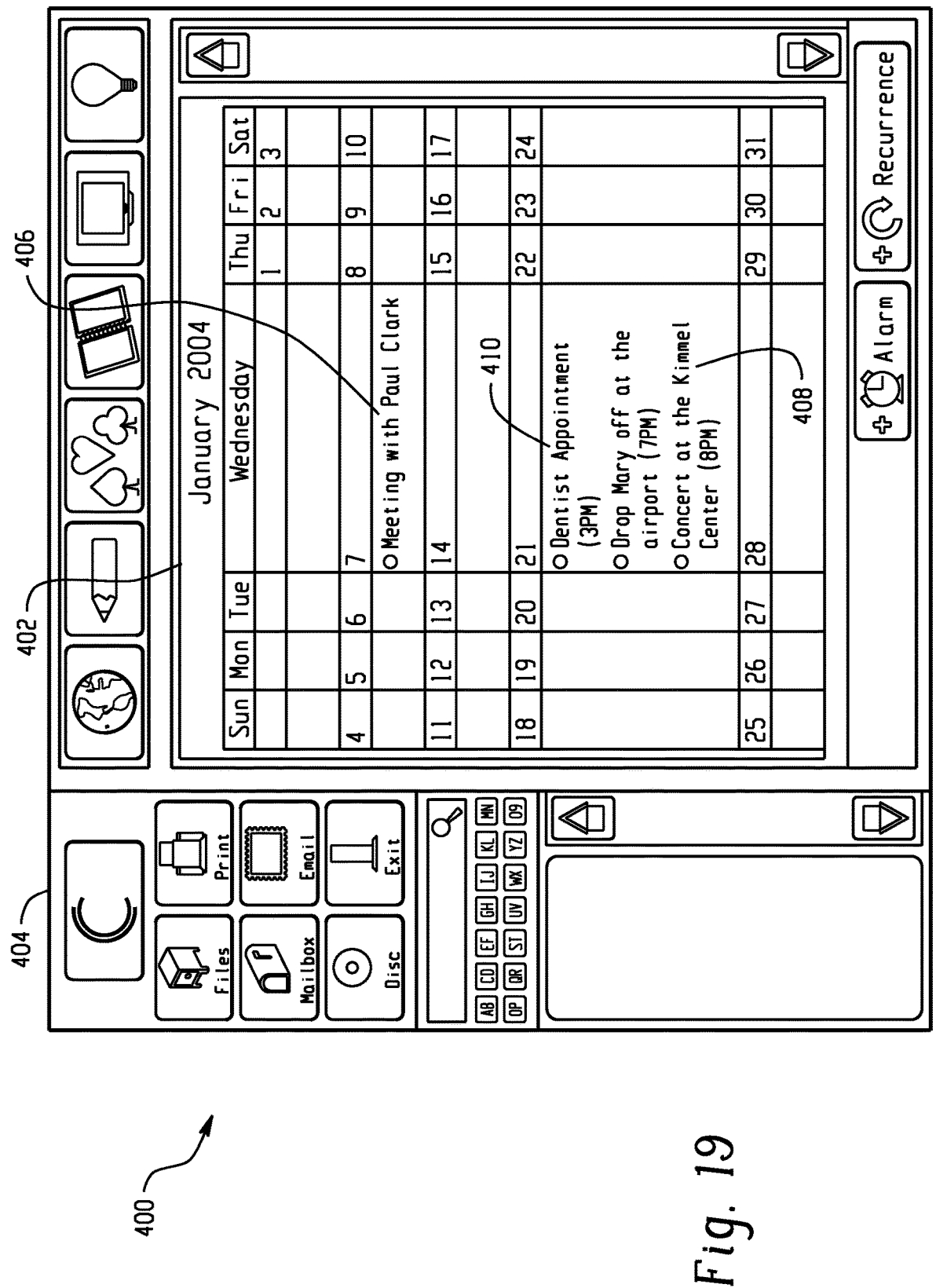
FIG. 19 depicts a calendar displayed in a customized user interface, where the calendar may be edited by a trusted third party.

FIG. 19 depicts a calendar 402 displayed in a customized user interface 404, where the calendar 402 may be edited by trusted third parties. For example, a daughter may be granted permission to edit a user's calendar as a trusted third party. The daughter may enter appointments such as a 'Meeting with Paul Clark' 406 or a 'Concert at the Kimmel Center' 408. Certain medical persons associated with the user may also be granted permission to edit a user's calendar. For example, a dentist may enter an appointment reminder 410 that would appear on the user's calendar and prompt a reminder to be displayed as the appointment approaches.

Figure 20:
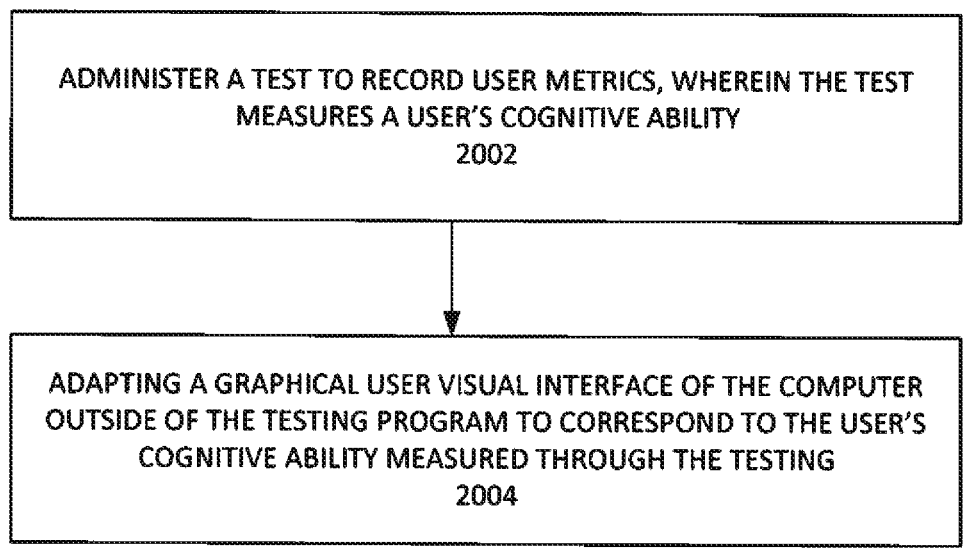
FIG. 20 depicts a computer-implemented method of adaptively controlling a user computer experience.

FIG. 20 depicts a computer-implemented method of adaptively controlling a user computer experience. At 2002, a test to record user metrics is administered using a computer-implemented testing program on a graphical user interface of a computer and one or more data processors, wherein the test measures a user's cognitive ability. At 2004, a graphical user visual interface of the computer outside of the testing program is adapted to correspond to the user's cognitive ability measured through the testing using the one or more data processors by adjusting one or more computing environment settings.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. Additionally, a system may include all of the features described in this specification or any combination thereof.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of adaptively controlling a user computer experience, comprising:
    administering, using a computer-implemented testing program on a graphical user interface of a computer and one or more data processors, a series of multiple tests to record user metrics;
    wherein the series of multiple tests measures a user's cognitive ability; and
    automatically adapting a graphical user visual interface of the computer having a plurality of icons, each icon having a size and a relative position to the other icons outside of the testing program throughout the user computer experience, the size of the plurality of icons being adjusted to correspond to the user's cognitive ability measured through the testing using the one or more data processors by adjusting one or more computing environment settings,
    wherein the relative position of each icon is maintained after adjusting the size of the plurality of icons.

2. The method of claim 1, wherein testing is periodically repeated to update the user metrics and the user interface is adapted according to updated user metrics.

3. The method of claim 2, wherein the repeating of the testing is in response to an increase in user errors or a decrease in user computer usage.

4. The method of claim 1, wherein the test is designed to detect reduced cognitive abilities in elderly computer users.

5. The method of claim 1, wherein user visual interface settings are stored remotely on a server enabling application of the user visual interface settings on different computers.

6. The method of claim 1, further comprising:
    providing a third party interface configured to allow a third party to upload content and modify user settings for use and display in the user computer experience.

7. The method of claim 6, wherein the third party interface enables a third party to manage a user calendar for display in the user computer experience;
    wherein reminders related to entries in the user calendar are displayed in the user computer experience.

8. The method of claim 6, wherein a third party must provide access credential information to access the third party interface.

9. The method of claim 8, wherein users or groups of users are granted permissions upload types of content or modify types of user settings.

10. The method of claim 9, wherein a group is defined by a criteria selected from the group consisting of: nuclear family, extended family, geographic location, financial management personnel, medical management personnel, users having common interests.

11. The method of claim 8, wherein users, groups, relationships among users or groups, and permissions associated with users and groups are stored in a database.

12. The method of claim 1,
    wherein the test is an eye test;
    wherein a user visual interface minimum text size is based on results of the eye test;
    wherein the visual interface minimum text size is applied throughout the user computer experience.

13. The method of claim 12,
    wherein a minimum icon size is set based on results of the eye test;
    wherein the minimum icon size is applied throughout the user computer experience.

14. The method of claim 12, wherein the testing, including the eye test is periodically repeated.

15. The method of claim 1, wherein adapting the user visual interface includes adapting functionality of the user visual interface to correspond to the user's cognitive ability measured through the testing.

16. The method of claim 1, wherein adapting the user visual interface includes adapting timing associated with the user visual interface to correspond to the user's cognitive ability measured through the testing.

17. The method of claim 16, wherein adjusting the timing includes adjusting a rate of repetition of information on the user visual interface or adjusting a time period before a change is manifest on the user visual interface.

18. A computer-implemented system for adaptive controlling a user computer experience, comprising:
    one or more data processors;
    one or more computer-readable mediums encoded with instructions for commanding the one or more data processors to execute steps including:
    administering, using a computer-implemented testing program on a graphical user interface of a computer and one or more data processors, a series of multiple tests to record user metrics;
    wherein the series of multiple tests measures a user's cognitive ability; and
    automatically adapting a graphical user visual interface of the computer having a plurality of icons, each icon having a size and a relative position to the other icons outside of the testing program throughout the user computer experience, the size of the plurality of icons being adjusted to correspond to the user's cognitive ability measured through the testing using the one or more data processors by adjusting one or more computing environment settings, wherein the relative position of each icon is maintained after adjusting the size of the plurality of icons.

19. A computer-readable medium encoded with instructions for commanding one or more data processors to execute a method that includes:

administering, using a computer-implemented testing program on a graphical user interface of a computer and one or more data processors, a series of multiple tests to record user metrics;

wherein the series of multiple tests measures a user's cognitive ability; and automatically adapting a graphical user visual interface of the computer having a plurality of icons, each icon having a size and a relative position to the other icons outside of the testing program throughout the user computer experience, the size of the plurality of icons being adjusted to correspond to the user's cognitive ability measured through the testing using the one or more data processors by adjusting one or more computing environment settings, wherein the relative position of each icon is maintained after adjusting the size of the plurality of icons.

\* \* \* \* \*